(12) United States Patent
Ishikawa et al.

(10) Patent No.: US 7,764,051 B2
(45) Date of Patent: Jul. 27, 2010

(54) ALTERNATING VOLTAGE GENERATION APPARATUS AND POWER OUTPUT APPARATUS

(75) Inventors: Tetsuhiro Ishikawa, Aichi-ken (JP); Hichirosai Oyobe, Toyota (JP); Yukihiro Minezawa, Anjo (JP)

(73) Assignees: Toyota Jidosha Kabushiki Kaisha, Toyota-Shi (JP); Aisin AW Co., Ltd., Anjo-Shi (JP)

( * ) Notice: Subject to any disclaimer, the term of this patent is extended or adjusted under 35 U.S.C. 154(b) by 635 days.

(21) Appl. No.: 11/791,337

(22) PCT Filed: Nov. 28, 2005

(86) PCT No.: PCT/JP2005/022243

§ 371 (c)(1),
(2), (4) Date: Jul. 6, 2007

(87) PCT Pub. No.: WO2006/059748

PCT Pub. Date: Jun. 8, 2006

(65) Prior Publication Data

US 2007/0289794 A1    Dec. 20, 2007

(30) Foreign Application Priority Data

Nov. 30, 2004    (JP) .............................. 2004-346892

(51) Int. Cl.
*H02P 11/00* (2006.01)
*H02P 9/00* (2006.01)
*H02H 7/06* (2006.01)

(52) U.S. Cl. .............................. 322/29; 322/44; 322/89; 322/90

(58) Field of Classification Search .................. 322/29, 322/44, 89, 90
See application file for complete search history.

(56) References Cited

U.S. PATENT DOCUMENTS

| 5,099,186 | A | 3/1992 | Rippel et al. ................. 318/803 |
| 6,392,905 | B1 * | 5/2002 | Huang et al. .................. 363/71 |
| 6,518,736 | B2 * | 2/2003 | Sasaki et al. .................. 322/16 |
| 6,630,804 | B2 * | 10/2003 | Moriya et al. ................. 318/85 |
| 6,930,460 | B2 * | 8/2005 | Ishikawa et al. ............ 318/442 |
| 7,099,756 | B2 * | 8/2006 | Sato ............................ 701/22 |
| 7,212,891 | B2 * | 5/2007 | Sato ............................ 701/22 |
| 7,265,455 | B2 * | 9/2007 | Oyobe et al. ................. 290/1 R |

(Continued)

FOREIGN PATENT DOCUMENTS

CN    2290546 Y    9/1998

(Continued)

*Primary Examiner*—T C Patel
*Assistant Examiner*—Pedro J Cuevas
(74) *Attorney, Agent, or Firm*—Oliff & Berridge, PLC

(57) ABSTRACT

A power output apparatus includes first and second motor generators, first and second inverters and a relay circuit. The first and second motor generators include first and second 3-phase coils, respectively. The first inverter alters periodically the potential at a first neutral point of the 3-phase coil. The second inverter alters periodically the potential of the second neutral point of the second 3-phase coil at phase corresponding to a phase-inverted version of the potential change of the first neutral point. The relay circuit responds to a control signal from the control device to electrically connect first and second AC lines to a connector, and provides an alternating voltage generated across the first and second neutral points to the connector.

14 Claims, 11 Drawing Sheets

U.S. PATENT DOCUMENTS

| | | | |
|---|---|---|---|
| 7,362,597 B2* | 4/2008 | Ishikawa et al. | 363/71 |
| 7,398,844 B2* | 7/2008 | Ishikawa et al. | 180/65.285 |
| 7,443,116 B2* | 10/2008 | Kutsuna et al. | 318/139 |
| 7,486,034 B2* | 2/2009 | Nakamura et al. | 318/139 |
| 7,486,035 B2* | 2/2009 | Oyobe et al. | 318/149 |
| 7,486,036 B2* | 2/2009 | Oyobe et al. | 318/376 |
| 7,495,399 B2* | 2/2009 | Oyobe et al. | 318/143 |
| 7,561,389 B2* | 7/2009 | Ishikawa et al. | 361/42 |
| 7,649,335 B2* | 1/2010 | Ishikawa et al. | 320/104 |
| 2003/0146726 A1* | 8/2003 | Ishikawa et al. | 318/442 |
| 2004/0233590 A1* | 11/2004 | Nakagawa et al. | 361/18 |
| 2006/0091836 A1* | 5/2006 | Oyobe et al. | 318/149 |
| 2007/0029986 A1* | 2/2007 | Nakamura et al. | 323/318 |
| 2007/0069673 A1* | 3/2007 | Oyobe et al. | 318/376 |
| 2007/0171689 A1* | 7/2007 | Ishikawa et al. | 363/71 |
| 2007/0247770 A1* | 10/2007 | Ishikawa et al. | 361/47 |
| 2008/0067973 A1* | 3/2008 | Ishikawa et al. | 320/104 |
| 2008/0073135 A1* | 3/2008 | Oyobe et al. | 180/65.4 |
| 2008/0077286 A1* | 3/2008 | Oyobe et al. | 701/22 |
| 2008/0185197 A1* | 8/2008 | Nakamura et al. | 180/65.2 |
| 2008/0197810 A1* | 8/2008 | Ishikawa et al. | 320/135 |
| 2008/0205106 A1* | 8/2008 | Nakamura et al. | 363/123 |
| 2008/0303529 A1* | 12/2008 | Nakamura et al. | 324/433 |
| 2009/0002903 A1* | 1/2009 | Uchida | 361/49 |
| 2009/0014222 A1* | 1/2009 | Tatematsu et al. | 180/65.2 |
| 2009/0040068 A1* | 2/2009 | Oyobe et al. | 340/932.2 |
| 2009/0058326 A1* | 3/2009 | Oyobe et al. | 318/53 |
| 2009/0067205 A1* | 3/2009 | Oyobe et al. | 363/98 |
| 2009/0090574 A1* | 4/2009 | Kuno | 180/65.265 |
| 2009/0101421 A1* | 4/2009 | Oyobe et al. | 180/65.29 |
| 2009/0114462 A1* | 5/2009 | Tahara et al. | 180/65.21 |
| 2009/0115251 A1* | 5/2009 | Nakamura et al. | 307/32 |
| 2009/0115355 A1* | 5/2009 | Oyobe et al. | 318/34 |
| 2009/0115358 A1* | 5/2009 | Kachi et al. | 318/139 |
| 2009/0115375 A1* | 5/2009 | Iida | 320/138 |
| 2009/0121659 A1* | 5/2009 | Oyobe et al. | 318/12 |
| 2009/0159348 A1* | 6/2009 | Oyobe et al. | 180/65.21 |
| 2009/0160247 A1* | 6/2009 | Nakamura et al. | 307/9.1 |
| 2009/0171554 A1* | 7/2009 | Yaguchi | 701/112 |
| 2009/0211826 A1* | 8/2009 | Hashimoto | 180/65.275 |
| 2009/0224720 A1* | 9/2009 | Oyobe et al. | 318/801 |
| 2009/0230901 A1* | 9/2009 | Amano | 318/400.3 |
| 2009/0237019 A1* | 9/2009 | Yamakawa et al. | 318/400.09 |
| 2009/0242286 A1* | 10/2009 | Tatematsu et al. | 180/65.21 |
| 2009/0242288 A1* | 10/2009 | Oyobe et al. | 180/65.265 |
| 2009/0243518 A1* | 10/2009 | Itoh | 318/98 |
| 2009/0250271 A1* | 10/2009 | Komatsu et al. | 180/65.6 |
| 2009/0250275 A1* | 10/2009 | Yoshida | 180/65.22 |
| 2009/0277702 A1* | 11/2009 | Kanada et al. | 180/65.29 |
| 2009/0301801 A1* | 12/2009 | Fujitake | 180/65.29 |
| 2009/0306841 A1* | 12/2009 | Miwa et al. | 701/22 |
| 2009/0315518 A1* | 12/2009 | Soma et al. | 320/134 |
| 2010/0001671 A1* | 1/2010 | Yamada et al. | 318/400.14 |
| 2010/0006359 A1* | 1/2010 | Ang et al. | 180/65.285 |
| 2010/0019569 A1* | 1/2010 | Izumi et al. | 307/9.1 |
| 2010/0025127 A1* | 2/2010 | Oyobe | 180/65.22 |
| 2010/0026237 A1* | 2/2010 | Ichikawa et al. | 320/109 |
| 2010/0027170 A1* | 2/2010 | Kishimoto | 361/31 |
| 2010/0027305 A1* | 2/2010 | Oyobe et al. | 363/131 |
| 2010/0038156 A1* | 2/2010 | Fujitake et al. | 180/65.22 |
| 2010/0045450 A1* | 2/2010 | Suzuki et al. | 340/438 |
| 2010/0063675 A1* | 3/2010 | Soma et al. | 701/36 |
| 2010/0072865 A1* | 3/2010 | Endo et al. | 310/68 D |

FOREIGN PATENT DOCUMENTS

| | | | |
|---|---|---|---|
| EP | 0 493 848 A2 | | 7/1992 |
| EP | 1780864 A1 | * | 5/2007 |
| JP | A 4-295202 | | 10/1992 |
| JP | A 8-126121 | | 5/1996 |
| JP | A 10-117403 | | 5/1998 |
| JP | A 10-225014 | | 8/1998 |
| JP | A 2000-324857 | | 11/2000 |
| JP | A 2002-171606 | | 6/2002 |
| JP | 2006050779 A | * | 2/2006 |
| JP | 2006158121 A | * | 6/2006 |
| JP | 2006158173 A | * | 6/2006 |
| JP | 2006320073 A | * | 11/2006 |
| JP | 2006345606 A | * | 12/2006 |
| JP | 2007089289 A | * | 4/2007 |
| WO | WO 2006132052 A2 | * | 12/2006 |
| WO | WO 2007037240 A1 | * | 4/2007 |

* cited by examiner

ALTERNATING VOLTAGE GENERATION APPARATUS AND POWER OUTPUT APPARATUS

TECHNICAL FIELD

The present invention relates to alternating voltage generation apparatuses and power output apparatuses. Particularly, the present invention relates to an alternating voltage generation apparatus and a power output apparatus generating an alternating voltage using two 3-phase coils.

BACKGROUND ART

Japanese Patent Laying-Open No. 8-126121 discloses a vehicle-mounted charger of an electric vehicle. This vehicle-mounted charger includes first and second 3-phase coils, first and second inverters, and a battery. A commercial power supply is connected to neutral points of the first and second 3-phase coils.

The first and second inverters are provided corresponding to and connected to the first 3-phase coil and the second 3-phase coil, respectively. The first and second inverters are connected in parallel with the battery.

When the battery is to be charged by the first and second inverters, control is adapted such that the first inverter conducts an equal current to the three coils in the first 3-phase coil, and the second inverter conducts a current equal to the current towards the three coils in the first 3-phase coil to the three coils in the second 3-phase coil. Accordingly, the first and second inverters convert the alternating voltage from the commercial power supply into a direct-current voltage for charging the battery.

The aforementioned publication of Japanese Patent Laying-Open No. 8-126121 discloses only the configuration of charging a battery using a commercial power supply. Therefore, there is a problem that it is difficult to generate an alternating voltage as a commercial power supply using two 3-phase coils for output to an external load.

DISCLOSURE OF THE INVENTION

In view of the foregoing, an object of the present invention is to provide an alternating voltage generation apparatus generating an alternating voltage using two 3-phase coils.

Another object of the present invention is to provide a power output apparatus generating an alternating voltage using to two 3-phase coils.

According to an aspect of the present invention, an alternating voltage generation apparatus includes first and second 3-phase coils, first and second inverters connected to the first and second 3-phase coils, respectively, for receiving a direct-current voltage from a voltage supply line, a relay circuit connected to a first neutral point of the first 3-phase coil and a second neutral point of the second 3-phase coil, and arranged between the first and second neutral points and an external load, and a control device controlling the operation of the first and second inverters and the relay circuit. The first inverter responds to a first control signal from the control device to generate a first alternating voltage having a predetermined frequency at the first neutral point. The second inverter responds to a second control signal from the control device to generate a second alternating voltage having a predetermined frequency, corresponding to a phase-inverted version of the first alternating voltage, at the second neutral point. The relay circuit responds to a third control signal from the control device to electrically connect the first and second neutral points with the external load to output to the external load a third alternating voltage having a predetermined frequency, and generated between the first and second neutral points.

Preferably, the first 3-phase coil includes first to third coils. The second 3-phase coil includes fourth to sixth coils. The first inverter includes first to third arms provided corresponding to the first to third coils respectively. The second inverter includes fourth to sixth arms provided corresponding to the fourth to sixth coils, respectively. The control device includes first and second control units controlling the first and second inverters, respectively. The first control unit controls switching of at least one of the first to third arms so as to conduct a first alternating current of identical phase, having a predetermined frequency, to at least one of the first to third coils. The second control unit controls switching of at least one of the fourth to sixth arms so as to conduct a second alternating current of identical phase, corresponding to a phase-inverted version of the first alternating current, to at least one of the fourth to sixth coils.

Preferably, the first 3-phase coil includes first to third coils. The second 3-phase coil includes fourth to sixth coils. The first inverter includes first to third arms provided corresponding to the first to third coils respectively. The second inverter includes fourth to sixth arms provided corresponding to the fourth to sixth coils, respectively. The control device includes first and second control units controlling the first and second inverters, respectively. The first control unit alters a first duty of the first to third arms according to a first curve varying at a predetermined frequency to control switching of the first to third arms. The second control unit alters a second duty of the fourth to sixth arms according to a second curve corresponding to a phase-inverted version of the first curve to control switching of the fourth to sixth arms.

Preferably, the first 3-phase coil includes first to third coils. The second 3-phase coil includes fourth to sixth coils. The first inverter includes first to third arms provided corresponding to the first to third coils respectively. The second inverter includes fourth to sixth arms provided corresponding to the fourth to sixth coils, respectively. The control device includes first and second control units controlling the first and second inverters, respectively. The first control unit controls the first inverter such that an alternating voltage generated by the first to third coils is converted into a direct-current voltage. The second control unit controls switching of at least one of the fourth to sixth arms such that an alternating current of identical phase, corresponding to a phase-inverted version of the alternating voltage generated by the first to third coils, is conducted to at least one of the fourth to sixth coils.

Preferably, the alternating voltage generation apparatus further includes a direct current power supply supplying a direct-current voltage to the voltage supply line. The control device determines whether to permit output of the third alternating voltage to the external load based on the state of charge of the direct current power supply.

Preferably, the relay circuit responds to a third control signal to electrically disconnect the first and second neutral points from the external load when the control device prohibits output of the third alternating voltage to the external load.

Preferably, the control device controls the first and second inverters such that a potential difference is not generated across the first and second neutral points when output of the third alternating voltage to the external load is prohibited.

Preferably, the control device ceases the operation of the first and second inverters when output of the third alternating voltage to the external load is prohibited.

According to another aspect of the present invention, a power output apparatus includes a first motor generator with a first 3-phase coil as a stator coil, a second motor generator with a second 3-phase coil as a stator coil, first and second inverters connected to the first and second 3-phase coils, respectively, receiving a direct-current voltage from a voltage supply line, a relay circuit connected to a first neutral point of the first 3-phase coil and a second neutral point of the second 3-phase coil, and arranged between the first and second neutral points and an external load, and a control device controlling the operation of the first and second inverters and the relay circuit. The first inverter responds to a first control signal from the control device to generate a first alternating voltage having a predetermined frequency at the first neutral point. The second inverter responds to a second control signal from the control device to generate a second alternating voltage having the predetermined frequency, corresponding to a phase-inverted version of the first alternating voltage, at the second neutral point. The relay circuit responds to a third control signal from the control device to electrically connect the first and second neutral points with the external load to output to the external load a third alternating voltage having a predetermined frequency, generated across the first and second neutral points.

Preferably, the first 3-phase coil includes first to third coils, and the second 3 phase coil includes fourth to sixth coils. The first inverter includes first to third arms provided corresponding to the first to third coils, respectively. The second inverter includes fourth to sixth arms provided corresponding to the fourth to sixth coils, respectively. The control device includes first and second control units controlling the first and second inverters, respectively. When the first and second motor generators are in a non-driving state, the first control unit controls switching of at least one of the first to third arms such that a first alternating current of identical phase having a predetermined frequency is conducted to at least one of the first to third coils, and the second control unit controls switching of at least one of the fourth to sixth arms such that a second alternating current of identical phase, corresponding to a phase-inverted version of the first alternating current, is conducted to at least one of the fourth to sixth coils.

Preferably, the first 3-phase coil includes first to third coils, and the second 3-phase coil includes fourth to sixth coils. The first inverter includes first to third arms provided corresponding to the first to third coils, respectively. The second inverter includes fourth to sixth arms provided corresponding to the fourth to sixth coils, respectively. The control device includes first and second control units controlling the first and second inverters, respectively. When the first and second motor generators are in a driving state, the first control unit alters a first duty of the first to third arms according to a first curve varying at a predetermined frequency to control switching of the first to third arms, and the second control unit alters a second duty of the fourth to sixth arms according to a second curve corresponding to a phase-inverted version of the first curve to control switching of the fourth to sixth arms.

Preferably, the first 3-phase coil includes first to third coils, and the second 3-phase coil includes fourth to sixth coils. The first inverter includes first to third arms provided corresponding to the first to third coils, respectively. The second inverter includes fourth to sixth arms provided corresponding to the fourth to sixth coils, respectively. The control device includes first and second control units controlling the first and second inverters, respectively. When the first motor is in a regenerative mode, and the second motor generator is in a non-driving state, the first control unit controls the first inverter such that an alternating voltage generated by the first to third coils is converted into a direct-current voltage, and the second control unit controls switching of at least one of the fourth to sixth arms such that an alternating current of identical phase, corresponding to a phase-inverted version of the alternating voltage generated by the first to third coils, is conducted to at least one of the fourth to sixth coils.

Further preferably, the power output apparatus further includes a direct current power supply supplying a direct-current voltage to the voltage supply line. The first motor modulator is coupled to an internal combustion engine of a vehicle. The second motor generator is coupled to a drive wheel of the vehicle. The control device controls the first inverter such that, when a state of charge of the direct current power supply is lower than a first predetermined value, output of the third alternating voltage to the external load is prohibited, and power is generated from the first motor generator by starting the internal combustion engine, and then permits output of the third alternating voltage to the external load after the state of charge of the direct current power supply exceeds at least a second predetermined value that is equal to or higher than the first predetermined value.

Preferably, the first predetermined value is higher as the temperature of the internal combustion engine is lower.

In the alternating voltage generation apparatus of the present invention, first and second alternating voltages having a predetermined frequency, and inverted in phase with each other, are generated at the first neutral point of the first 3-phase coil and the second neutral point of the second 3-phase coil, respectively. The relay circuit connected to the first and second neutral points, and arranged between the first and second neutral points and the external load responds to the third control signal from the control device to electrically connect the first and second neutral points with the external load, and outputs a third alternating voltage having the predetermined frequency, and generated across the first and second neutral points, to the external load.

Therefore, according to the present invention, an alternating voltage that can be output to an external load is generated using two 3-phase coils, and the generated alternating voltage can be supplied to the external load via a relay circuit.

According to the alternating voltage generation apparatus of the present invention, the control device determines whether or not to permit output of the third alternating voltage, generated across the first and second neutral points, to the external load, based on the state of charge of the direct current power supply. Therefore, determination can be made whether the third alternating voltage can be generated stably or not before output of the third alternating voltage. As a result, output of an unstable alternating voltage can be prevented.

According to the alternating voltage generation apparatus of the present invention, the relay circuit electrically disconnects the first and second neutral points from the external load when output of the third alternating voltage to the external load is not permitted by the control device. Therefore, output of an unstable alternating voltage can be prevented.

According to the alternating voltage generation apparatus of the present invention, the control device controls the first and second inverters such that a voltage difference is not generated across the first and second neutral points when output of the third alternating voltage to the external load is prohibited. Therefore, an unstable alternating voltage will not be output even if a defect occurs in the relay circuit such as welding.

According to the alternating voltage generation apparatus of the present invention, the control device ceases the operation of the first and second inverters when output of the third alternating voltage to the external load is prohibited. Therefore, output of an unstable alternating voltage can be prevented reliably.

In the power output apparatus of the present invention, first and second alternating voltages having a predetermined frequency, and phase-inverted with respect to each other, are generated at the first neutral point of the first 3-phase coil included in the first motor generator and at the second neutral point of the second 3-phase coil included in the second motor generator, respectively. The relay circuit connected to the first and second neutral points, and arranged between the first and second neutral points and the external load, electrically connects the first and second neutral points to the external load in response to the third control signal from the control device to output the third alternating voltage having the predetermined frequency, and generated across the first and second neutral points, to the external load.

Therefore, according to the present invention, an alternating voltage that can be output to an external load is generated using two 3-phase coils in the motor generators, and the generated alternating voltage can be output to the external load. Further, a dedicated inverter to generate an alternating voltage for output to an external load does not have to be provided additionally. Furthermore, the two inverters contribute together to generating an alternating voltage.

In the power output apparatus of the present invention, the control device prohibits output of the third alternating voltage, and starts the internal combustion engine to generate power through the first motor generator when the state of charge of the direct current power supply is insufficient, and then permits output of the third alternating voltage after the state of charge of the direct current power supply is sufficient to generate the alternating voltage stably. Therefore, output of unstable alternating voltage can be prevented according to the present invention.

In the power output apparatus of the present invention, a first predetermined value that is the threshold value of the charging state of the direct current power supply to determine whether output of the third alternating voltage to the external load is to be permitted or not becomes higher as the temperature of the internal combustion engine is lower. Therefore, the starting timing of the internal combustion engine becomes advanced as the temperature is lower corresponding to the case where a larger starting torque is required.

Therefore, according to the present invention, the state of the internal combustion engine is also taken into account in the determination of whether to permit output of the third alternating voltage to the external load. Output of an unstable alternating voltage is prevented while the event of not being able to drive the internal combustion engine in a low-temperature state can be avoided.

The foregoing and other objects, features, aspects and advantages of the present invention will become more apparent from the following detailed description of the present invention when taken in conjunction with the accompanying drawings.

BEST MODE FOR CARRYING OUT THE INVENTION

Figure 1:
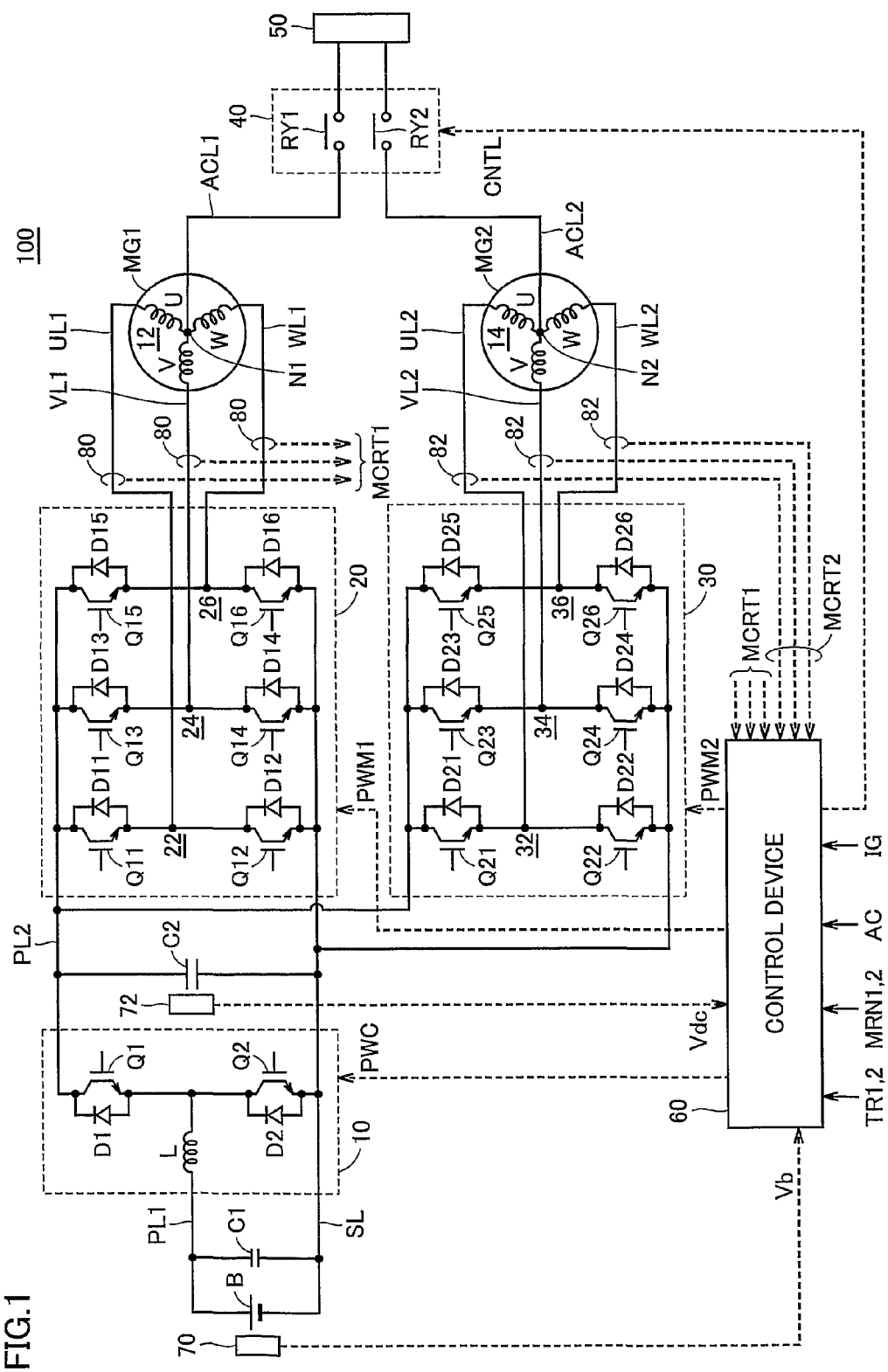
FIG. 1 is a schematic block diagram of a power output apparatus according to an embodiment of the present invention.

Embodiments of the present invention will be described in detail hereinafter with reference to the drawings. In the drawings, the same or corresponding components have the same reference characters allotted, and description thereof will not be repeated.

Referring to the schematic block diagram of FIG. 1, a power output apparatus 100 according to an embodiment of the present invention includes a battery B, an up-converter 10, inverters 20 and 30, motor generators MG1 and MG2, a relay circuit 40, a connector 50, a control device 60, capacitors C1 and C2, power supply lines PL1 and PL2, a ground line SL, U-phase lines UL1 and UL2, V-phase lines VL1 and VL2, W-phase lines WL1 and WL2, AC lines ACL1 and ACL2, voltage sensors 70 and 72, and current sensors 80 and 82.

Power output apparatus 100 is incorporated into, for example, a hybrid vehicle. Motor generator MG1 is incorporated into the hybrid vehicle operating as a power generator driven by an engine, and operating as a motor that can start the engine. Motor generator MG2 is incorporated into the hybrid vehicle as a motor that can drive the driving wheels of the hybrid vehicle.

Motor generators MG1 and MG2 are formed of 3-phase alternating synchronous motors, for example, and include 3-phase coils 12 and 14, respectively, as stator coils. Motor generator MG1 generates a 3-phase alternating voltage using the engine output to output the generated 3-phase alternating voltage to inverter 20. Motor generator MG1 also generates a driving force by the 3-phase alternating voltage from inverter 20 to start the engine. Motor generator MG2 generates a driving torque of the vehicle by the 3-phase alternating voltage from inverter 30. At the time of regenerative braking of the vehicle, motor generator MG2 generates and outputs to inverter 30 a 3-phase alternating voltage.

Battery B that is the direct current power supply is formed of, for example, a nickel-hydrogen or lithium-ion secondary battery. Battery B outputs the generated direct-current voltage to up-converter 10, and is charged by the direct-current voltage output from up-converter 10.

Up-converter 10 includes a reactor L, npn transistors Q1 and Q2 and diodes D1 and D2. Reactor L has one end connected to a power supply line PL1, and the other end connected to the connection node of npn transistors Q1 and Q2. Npn transistors Q1 and Q2 are formed of, for example, IGBT (Insulated Gate Bipolar Transistor), connected in series between a power supply line PL2 and a ground line SL to receive a signal PWC from control device 60 at its base.

Diodes D1 and D2 are connected across the collector and emitter of npn transistors Q1 and Q2, respectively, so as to conduct current from the emitter side towards the collector side.

Inverter 20 includes a U-phase arm 22, a V-phase arm 24, and a W-phase arm 26. U-phase arm 22, V-phase arm 24 and W-phase arm 26 are connected in parallel between power supply line PL2 and ground line SL. U-phase arm 22 is formed of npn transistors Q11 and S12 connected in series. V-phase arm 24 is formed of npn transistors Q13 and Q14 connected in series. W-phase arm 26 is formed of npn transistors Q15 and Q16 connected in series. Each of npn transistors Q11-Q16 is formed of, for example, an IGBT. Diodes D11-D16 for conducting current from the emitter side to the collector side are connected across the collector and emitter of npn transistors Q11-Q16, respectively. The connection nodes of respective npn transistors in each phase arm are connected via the U, V, and W phase lines of UL1, VL1 and WL1 to respective coil ends of each phase coil of motor generator MG1 that differs from neutral point N1.

Inverter 30 includes a U-phase arm 32, a V-phase arm 34 and W-phase arm 36. U-phase arm 32, V-phase arm 34 and W-phase arm 36 are connected in parallel between power supply line PL2 and ground line SL. U-phase arm 32 is formed of npn transistors Q21 and Q22 connected in series. V-phase arm 34 is formed of npn transistors Q23 and Q24 connected in series. W-phase arm 36 is formed of npn transistors Q25 and Q26 connected in series. Each of npn transistors Q21-Q26 is also formed of an IGBT, for example. Diodes D21-D26 for conducting current from the emitter side to the collector side are connected across the collector and emitter of npn transistors Q21-Q26, respectively. In inverter 30, the connection nodes of respective npn transistors in each phase arm are connected via U-phase line UL2, V-phase line VL2, and W-phase line WL2 to respective coil ends of each phase coil in motor generator MG2 different from neutral point N2

Capacitor C1 is connected between power supply line PL1 and ground line SL to reduce the effect caused by voltage variation on battery B and up-converter 10. Capacitor C2 is connected between power supply line PL2 and ground line SL to reduce the effect caused by voltage variation on inverters 20 and 30 and up-converter 10.

Up-converter 10 boosts the direct-current voltage supplied from battery B via power supply line PL1 to output the boosted voltage to power supply line PL2. Specifically, up-converter 10 responds to signal PWC from control device 60 to store the flowing current according to the switching operation by npn transistor Q2 as the magnetic field energy at reactor L to boost the direct-current voltage from battery B, and provides the boosted voltage onto power supply line PL2 via diode D1 in synchronization with the OFF timing of npn transistor Q2. Up-converter 10 responds to signal PWC from control device 60 to down-convert the direct-current voltage from inverter 20 and/or 30 via power supply line PL2 into the voltage level of battery B to charge battery B.

Inverter 20 responds to a signal PWM1 from control device 60 to convert the direct-current voltage supplied from power supply line PL2 into a 3-phase alternating voltage to drive motor generator MG1. Accordingly, motor generator MG1 is driven so as to generate a torque designated by a torque control value TR1. Inverter 20 converts the 3-phase alternating voltage generated by motor generator MG1 by receiving an output from the engine into a direct-current voltage based on signal PWM1 from control device 60 to output the converted direct-current voltage onto power supply line PL2.

Inverter 30 responds to a signal PWM2 from control device 60 to convert the direct-current voltage supplied from power supply line PL2 into a 3-phase alternating voltage to drive motor generator MG2. Accordingly, motor generator MG2 is driven so as to generate a torque designated by a torque control value TR2. At the time of regenerative braking of the hybrid vehicle to which power output apparatus 100 is incorporated, inverter 30 converts the 3-phase alternating voltage generated by motor generator MG2 by receiving the rotating force from the drive shaft into a direct-current voltage based on signal PWM2 from control device 60 to provide the converted direct-current voltage to power supply line PL2. As used herein, "regenerative braking" includes the braking operation with the regenerative power generation when the driver of the hybrid vehicle depresses the foot brake, or reducing the speed (or ceasing acceleration) of the vehicle during regenerative power generation by turning off the accelerator pedal during driving without operating the foot brake.

Relay circuit 40 includes relays RY1 and RY2. Relays RY1 and RY2 are formed of, for example, mechanical contact relays. Alternatively, they may be semiconductor relays. Relay RY1 is provided between an AC line ACL1 and connector 50, and turned on/off in response to a control signal CNTL from control device 60. Relay RY2 is provided between an AC line ACL2 and connector 50, and turned on/off in response to control signal CNTL from control device 60.

Relay circuit 40 responds to control signal CNTL from control device 60 to connect/disconnect AC lines ACL1 and ACL2 to/from connector 50. Specifically, relay circuit 40 responds to control signal CNTL of an H level (logical high) from control signal 60 to electrically connect AC lines ACL1 and ACL2 to connector 50, and responds to control signal CNTL of an L level (logical low) from control device 60 to electrically disconnect AC lines ACL1 and ACL2 from connector 50.

Connector 50 is an output terminal to output an alternating voltage Vac generated across neutral points N1 and N2 of motor generators MG1 and MG2 to an external load, and is connected to a receptacle for the power supply of an electrical apparatus, or a socket for domestic emergency power supply.

Voltage sensor 70 detects a battery voltage Vb of battery B, and provides the detected battery voltage Vb to control device 60. Voltage sensor 72 detects the voltage across capacitor C2, i.e. voltage Vdc output from up-converter 10 (corresponding to the input voltage to inverters 20 and 30; the same applies hereinafter), and provides the detected voltage Vdc to control device 60.

Current sensor 80 detects motor current MCRT1 flowing to motor generator MG1, and provides the detected motor current MCRT1 to control device 60. Current sensor 82 detects a motor current MCRT2 flowing to motor generator MG2, and provides the detected motor current MCRT2 to control device 60.

Control device 60 generates a signal PWC to drive an up-converter 10, based on torque control values TR1 and TR2 and motor revolution counts MRN1 and MRN2 of motor generators MG1 and MG2, output from an externally-provided ECU (Electronic Control Unit), battery voltage Vb from voltage sensor 70, and voltage Vdc from voltage sensor 72. The generated signal PWC is output to up-converter 10.

Control device 60 generates and provides to inverter 20 a signal PWM1 to drive motor generator MG1, based on voltage Vdc, as well as motor current MCRT1 and torque control value TR1 of motor generator MG1. Control device 60 also generates and provides to inverter 30 a signal PWM2 to drive motor generator MG2, based on voltage Vdc, as well as motor current MCRT2 and torque control value TR2 of motor generator MG2.

Control device 60 generates signals PWM1 and PWM2 to control inverters 20 and 30 such that alternating voltage Vac for commercial power supply is generated across neutral points N1 and N2 of motor generators MG1 and MG2, based on a signal IG from the ignition switch (or ignition key) and a signal AC from the ECU. Signals IG and AC will be described afterwards.

Further, control device 60 determines whether alternating voltage Vac for commercial power supply generated across neutral points N1 and N2 of motor generators MG1 and MG2 can be output stably to the external load based on the SOC (State Of Charge) of battery B and the power-generating state of power generator MG1 that generate power according to the engine output. When determination is made that alternating voltage Vac can be output stably, control signal CNTL of an H level is output to relay circuit 40. When determination is made that alternating voltage Vac cannot be output stably, control signal CNTL of an L level is output to relay circuit 40, whereby control device 60 executes an AC output stop process to prevent generation of a voltage difference across neutral points N1 and N2 of motor generators MG1 and MG2.

Figure 2:
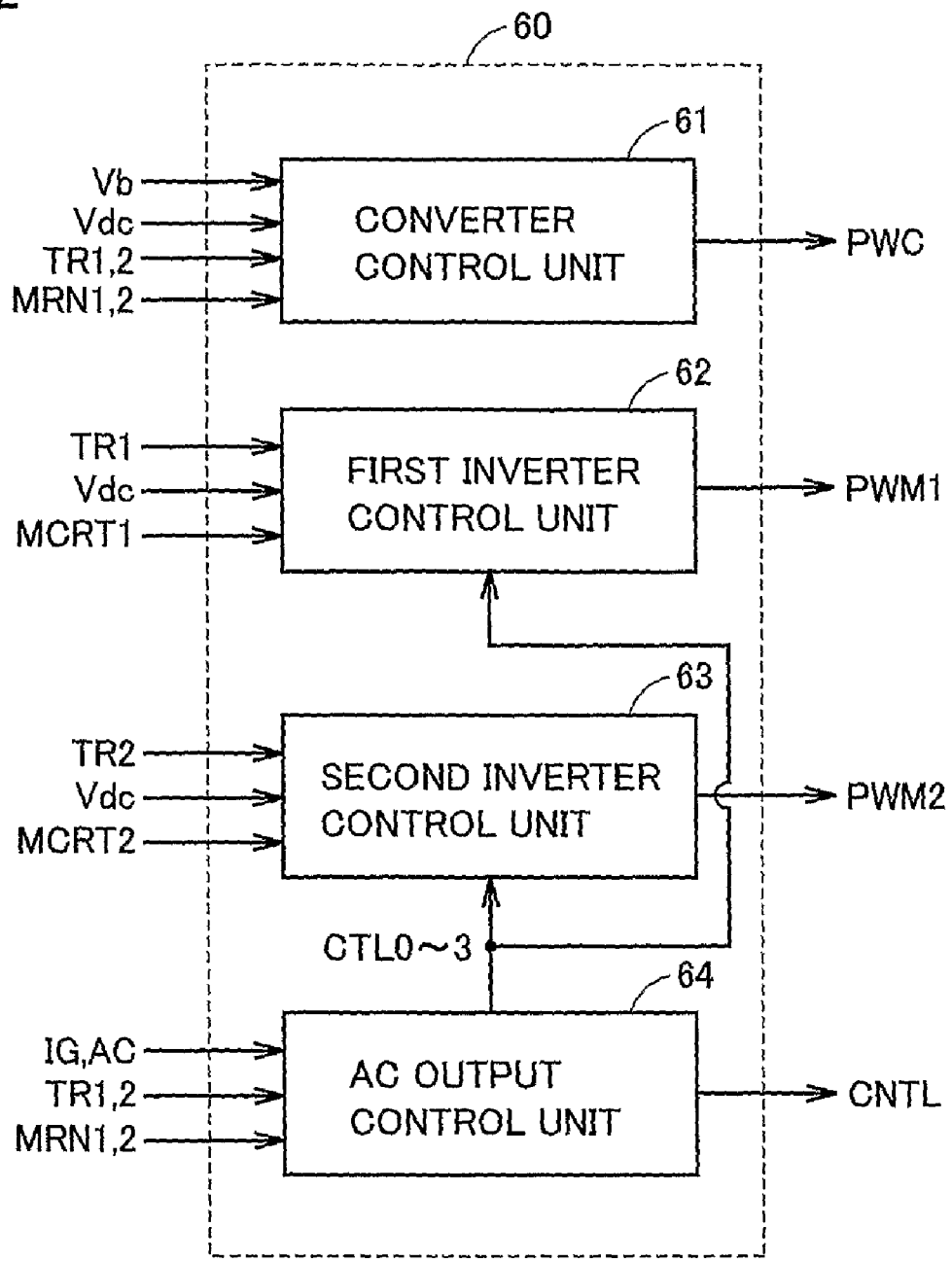
FIG. 2 is a functional block diagram of a control device of FIG. 1.

Referring to the functional block diagram of FIG. 2, control device 60 includes a converter control unit 61, first and second inverter control units 62 and 63, and an AC output control unit 64. Converter control unit 61 generates a signal PWC to turn ON/OFF npn transistors Q1 and Q2 of up-converter 10, based on battery voltage Vb, voltage Vdc, torque control values TR1 and TR2, and motor revolution counts MRN1 and MRN2. The generated signal PWC is output to up-converter 10.

First inverter control unit 62 generates and provides to inverter 20 a signal PWM1 to turn ON/OFF npn transistors Q11-Q16 of inverter 20, based on torque control value TR1 and motor current MCRT1 of motor generator MG1, as well as voltage Vdc.

Second inverter control unit 63 generates and provides to inverter 30 a signal PWM2 to turn ON/OFF npn transistors Q21-Q26 of inverter 30, based on torque control value TR2 and motor current MCRT2 of motor generator MG2, as well as voltage Vdc.

AC output control unit 64 responds to signals IG and AC to determine the driving state of motor generators MG1 and MG2 based on torque control values TR1 and TR2 and motor revolution counts MRN1 and MRN2. Signal AC has its logic level altered according to the operation of, for example, AC output switch. Signal AC of an H level indicates that output of alternating voltage Vac for commercial power supply is requested. Signal AC of an L level indicates that output of alternating voltage Vac is not requested. Signal IG has its logic level altered according to the operation of the ignition switch. Signal IG of an H level indicates that the hybrid vehicle to which power output apparatus 100 is incorporated has been started up. Signal IG of an L level indicates that the hybrid vehicle has been turned off.

In order to generate alternating voltage Vac according to the driving state of motor generators MG1 and MG2, AC output control unit 64 generates and provides to first and second inverter control units 62 and 63 control signals CTL0-CTL3.

Specifically, upon receiving signal IG of an H level and then signal AC of an L level, AC output control unit 64 determines that generation of alternating voltage Vac is not requested, and generates and provides to first and second inverter control units 62 and 63 a control signal CTL0.

When AC output control unit 64 receives signal IG of an L level and then signal AC of an H level, AC output control unit 64 determines that generation of alternating voltage Vac has been requested when the hybrid vehicle is in an OFF state (non-driving state of motor generators MG1 and MG2) to generate and provide to first and second inverter control units 62 and 63 a control signal CTL1.

Upon receiving signal IG of an H level and then signal AC of an H level, AC output control unit 64 determines whether motor generators MG1 and MG2 are in a regenerative mode or a power running mode based on torque control values TR1 and TR2 and motor revolution counts MRN1 and MRN2. Specifically, in rectangular coordinates with the motor revolution count taken along the axis of abscissa and the torque control values taken along the axis of ordinates, motor generator MG1 is in a power running mode when the relationship between motor revolution count MRN1 and torque control value TR1 is present in the first or second quadrant, and motor generator MG1 is in a regenerative mode when the relationship between motor revolution count MRN1 and torque control value TR1 lies in the third or fourth quadrant. Thus, AC output control unit 64 determines whether motor generator MG1 is in a power running mode or regenerative mode depending upon which of the first to fourth quadrants the relationship between motor rotation count MRN1 and torque control value TR1 lies in. In a similar manner, AC output control unit 64 determines whether motor generator MG2 is in a power running mode or a regenerative mode depending upon which of the first to fourth quadrants the relationship between motor revolution count MRN2 and torque control value TR2 lies in.

Upon determining that motor generator MG1 (or MG2) is in a power running mode, AC output control unit 64 determines that generation of alternating voltage Vac is requested during the power running mode of motor generator MG1 (or MG2) to generate and provide to first and second inverter control units 62 and 63 a control signal CTL2.

Upon determining that motor generator MG1 (or MG2) is in a regenerative mode, AC output control unit 64 determines that generation of alternating voltage Vac is requested during the regenerative mode of motor generator MG1 (or MG2) to generate and provide to first and second inverter control units 62 and 63 a control signal CTL3

Further, AC output control unit 64 determines whether alternating voltage Vac can be output stably to the external load connected to connector 50. Control signal CNTL of an H level is output to relay circuit 40 when determination is made that alternating voltage Vac can be output stably. Control signal CNTL of an L level is output to relay circuit 40 when determination is made that alternating voltage Vac cannot be output stably.

Figure 3:
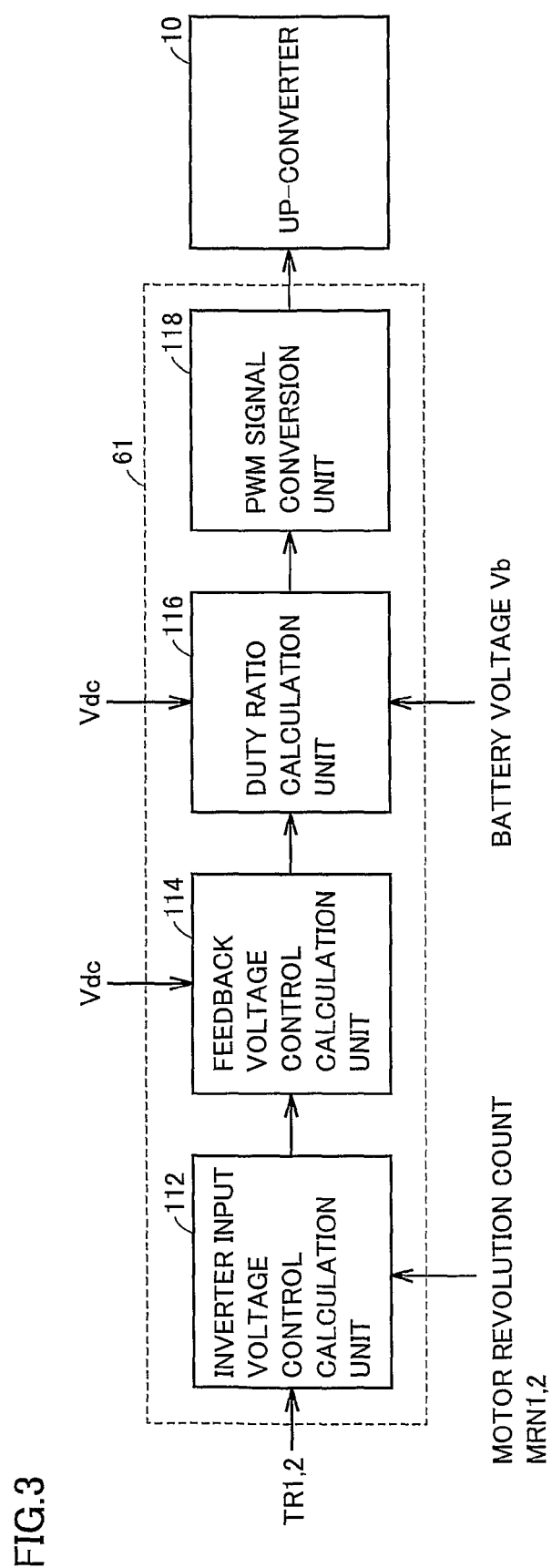
FIG. 3 is a functional block diagram of a converter control unit of FIG. 2.

Referring to the functional block diagram of FIG. 3, converter control unit 61 includes an inverter input voltage control calculation unit 112, a feedback voltage control calculation unit 114, a duty ratio calculation unit 116, and a PWM signal conversion unit 118.

Inverter input voltage control calculation unit 112 calculates the optimum value (target value) of the inverter input voltage, i.e. voltage control value Vdc_corn, based on torque control values TR1 and TR2 and motor revolution counts MRN1 and MRN2. The calculated voltage control value Vdc_com is provided to feedback voltage control calculation unit 114.

Feedback voltage control calculation unit 114 calculates a feedback voltage control value Vdc_com_fb to regulate output voltage Vdc to the level of voltage control value Vdc_com, based on output voltage Vdc of up-converter 10 detected by voltage sensor 72 and voltage control value Vdc_com from inverter input voltage control calculation unit 112. The calculated feedback voltage control value Vdc_com_fb is output to a duty ratio calculation unit 116.

Duty ratio calculation unit 116 calculates the duty ratio to regulate output voltage Vdc of up-converter 10 to the level of voltage control value Vdc_com, based on battery voltage Vb from voltage sensor 70 and feedback voltage control value Vdc_com_fb from feedback voltage control calculation unit 114. The calculated duty ratio is provided to PWM signal conversion unit 118.

PWM signal conversion unit 118 generates a PWM (pulse width modulation) signal to turn ON/OFF npn transistors Q1 and Q2 of up-converter 10 based on the duty ratio from duty ratio calculation unit 116. The generated PWM signal is output to npn transistors Q1 and Q2 of up-converter 10 as signal PWC.

Since the power accumulation at reactor L is increased as the ON duty of npn transistor Q2 of the lower arm of up-converter 10 becomes higher, a higher voltage output can be obtained. The voltage of power supply line PL2 becomes lower as the ON duty of npn transistor Q1 of the upper arm becomes higher. Therefore, the voltage of power supply line PL2 can be set to an arbitrary voltage higher than or equal to the output voltage of battery B by controlling the duty ratio of npn transistors Q1 and Q2.

Figure 4:
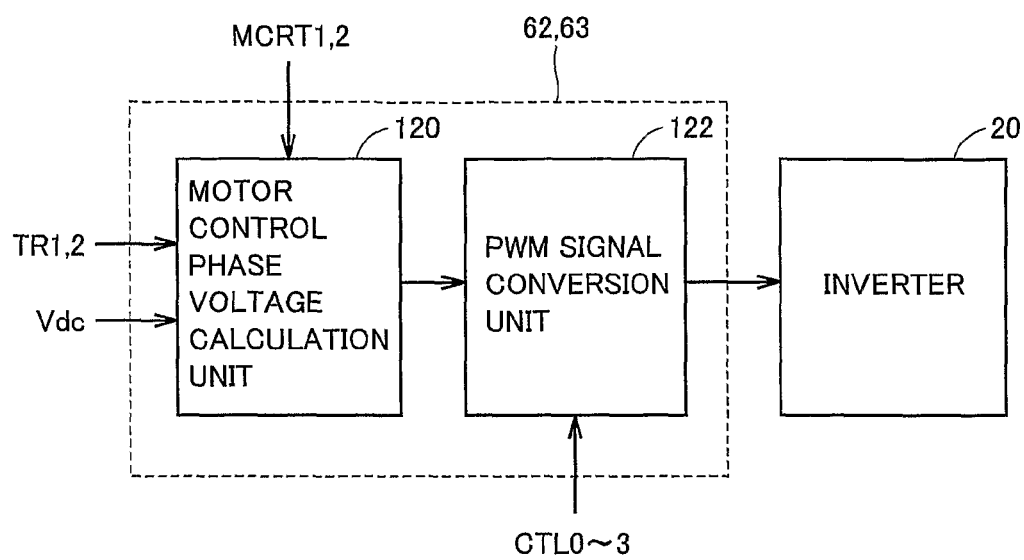
FIG. 4 is a functional block diagram of first and second inverter control units of FIG. 2.

Referring to the functional block diagram of FIG. 4, first and second inverter control units 62 and 63 each include a motor control phase voltage calculation unit 120 and a PWM signal conversion unit 122.

Motor control phase voltage calculation unit 120 receives input voltage Vdc of inverters 20 and 30 from voltage sensor 72, motor current MCRT1 (or MCRT2) flowing through each phase of motor generator MG1 (or MG2) from current sensor 80 (or 82), and torque control value TR1 (or TR2) from the ECU. Motor control phase voltage calculation unit 120 calculates the voltage to be applied to each phase coil in motor generator MG1 (or MG2) based on these input values. The calculated voltage of each phase coil is output to PWM signal conversion unit 122.

PWM signal conversion unit 122 generates a signal PWM1_0 (one type of signal PWM1) (or PWM2_0 (one type of signal PWM2)) that turns ON/OFF each of npn transistors Q11-Q16 (or Q21-Q26) of inverter 20 (or 30), based on the voltage control value of each phase from motor control phase voltage calculation unit 120 upon receiving control signal CTL0 from AC output control unit 64. The generated signal PWM1_0 (or PWM2_0) is output to each of npn transistors Q1-Q16 (or Q21-Q26) of inverter 20 (or 30).

Thus, each of npn transistors Q11-Q16 (or Q21-Q26) has its switching controlled, whereby the current to be conducted to each phase of motor generator MG1 (or MG2) so as to output the torque designated by motor generator MG1 (or MG2) is controlled. As a result, a motor torque corresponding to torque control value TR1 (or TR2) is output.

Upon receiving control signal CTL1 from AC output control unit 64, PWM signal conversion unit 122 generates a signal PWM1_1 (one type of signal PWM1) (or signal PWM2_1 (one type of signal PWM2)) that turns ON/OFF npn transistors Q11-Q16 (or Q21-Q26) so as to conduct an alternating current of the same phase to U-phase arm 22 (or 32), V-phase arm 24 (or 34), and W-phase arm 26 (or 36) of inverter 20 (or 30). The generated signal PWM1_1 (or PWM2_1) is output to npn transistors Q11-Q16 (or Q21-Q26) of inverter 20 (or 30).

Upon receiving control signal CTL2 from AC output control unit 64, PWM signal conversion unit 122 generates a signal PWM1_2 (one type of signal PWM1) (or PWM2_2) (one type of signal PWM2)) that turns ON/OFF each of npn transistors Q11-Q16 (or Q21-Q26) of inverter 20 (or 30) while altering the duty to control switching at the commercial alternating frequency, based on each phase coil voltage control value from motor control phase voltage calculation unit 120. The generated signal PWM1_2 (or PWM2_2) is output to npn transistors Q11-Q16 (or Q21-Q26) of inverter 20 (or 30).

Upon receiving control signal CTL3 from AC output control unit 64, PWM signal conversion unit 122 generates a signal PWM1_3 (one type of signal PWM1) (or PWM2_3) (one type of signal PWM2)) that turns ON/OFF each of npn transistors Q11-Q16 (or Q21-Q26) of inverter 20 (or 30) such that motor generator MG1 (or MG2) generates an alternating voltage at the commercial alternating frequency. The generated signal PWM1_3 (or PWM2_3) is output to npn transistors Q11-Q16 (or Q21-Q26) of inverter 20 (or 30).

The method of generating alternating voltage Vac for commercial power supply at power output apparatus 100 will be described hereinafter. First, the method of generating alternating voltage Vac when motor generators MG1 and MG2 are in a non-driving state in power output apparatus 100 will be described.

Figure 5:
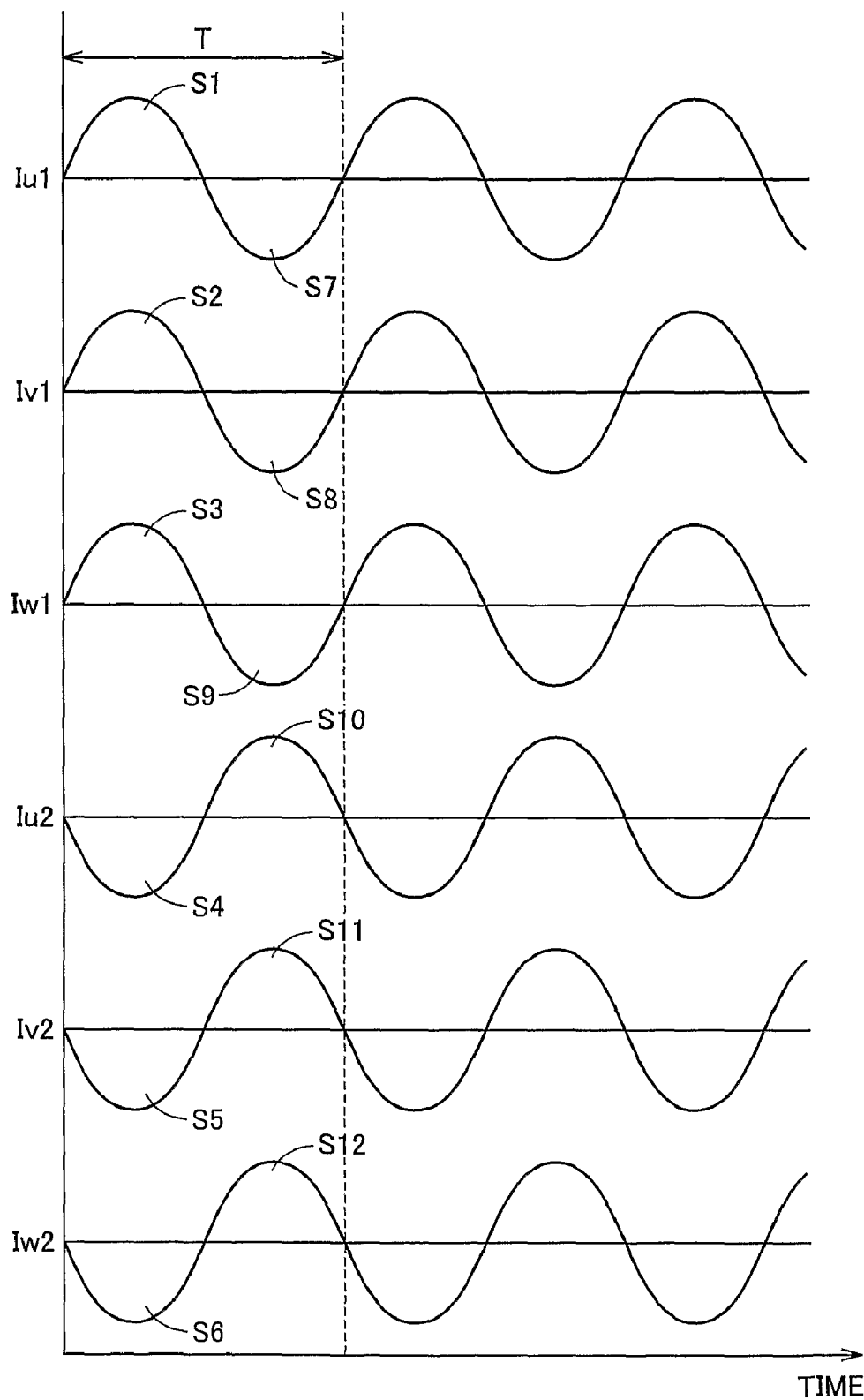
FIG. 5 is a timing chart of an alternating current conducted to the 3-phase coils of the motor generators of FIG. 1.
Figure 6:
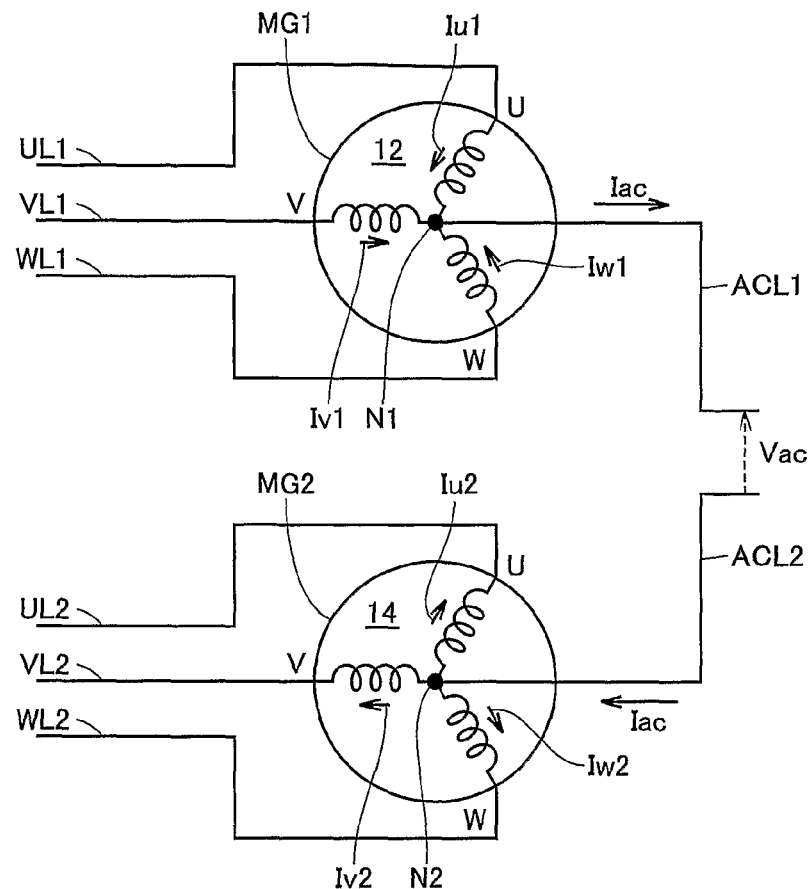
FIG. 6 represents the current flowing to the motor generators.

FIG. 5 is a timing chart of the alternating current conducted to 3-phase coils 12 and 14 of motor generators MG1 and MG2 shown in FIG. 1. FIG. 6 represents the current conducted to motor generators MG1 and MG2. FIG. 6 corresponds to the case where alternating current Iac is conducted from neutral point N1 of motor generator MG1 to neutral point N2 of motor generator MG2.

Referring to FIG. 5, control device 60 controls the switching of U-phase arm 22, V-phase arm 24, and W-phase arm 26 of inverter 20 such that an alternating current of the same phase at the commercial alternating frequency is conducted to each phase coil of 3-phase coil 12, and controls switching of U-phase arm 32, V-phase arm 34, and W-phase arm 36 of inverter 30 such that an alternating current of the same phase, corresponding to a phase-inverted version of the alternating current conducted to each phase coil of 3-phase coil 12, is conducted to each phase coil of 3-phase coil 14.

Specifically, at the former half of one cycle T of alternating currents Iu1, Iv1, Iw1; Iu2, Iv2, Iw2, npn transistors Q11, Q13 and Q15 are subjected to switching control, and npn transistors Q12, Q14 and Q16 are turned OFF in inverter 20. In inverter 30, npn transistors Q21, Q23 and Q25 are turned OFF, and npn transistors Q22, Q24 and Q26 are switching-controlled.

At the latter half of one cycle T, npn transistors Q11, Q13 and Q15 are turned off, and npn transistors Q12, Q14 and Q16 are switching-controlled in inverter 20. In inverter 30, npn transistors Q21, Q23 and Q25 are switching-controlled, and npn transistors Q22, Q24 and Q26 are turned OFF.

Accordingly, an alternating voltage having a commercial alternating frequency is generated at neutral point N1 of 3-phase coil 12, whereas an alternating voltage that is a phase-inverted version of the alternating voltage generated at neutral point N1 of 3-phase coil 12 is generated at neutral point N2 of 3-phase coil 14. When the external load is connected to connector 50 and relay circuit 40 is turned ON, current flows from npn transistors Q11, Q13 and Q15 (not shown) to npn transistors Q22, Q24 and Q26 (not shown) via phase lines UL1, VL1 and WL1 of each of the U, V and W phases, each phase coil of 3-phase coil 12, neutral point N1, AC line ACL1, the external load, AC line ACL2, neutral point N2, each phase coil of 3-phase coil 14, and phase lines UL2, VL2 and WL2 of the U, V and W phases, as shown in FIG. 6, at the former half of one cycle T. At the latter half of one cycle T, current flows from npn transistors Q21, Q23 and Q25 to npn transistors Q12, Q14, Q16 via phase lines UL2, VL2 and WL2 of each of the U, V and W phases, each phase coil of 3-phase coil 14, neutral point N2, AC line ACL2, the external load, AC line ACL1, neutral point N1, each phase coil of 3-phase coil 12, and phase lines UL1, VL1 and WL1 of the U, V and W phases.

Thus, a current whose direction is switched for every half period of one cycle T, i.e. alternating current Iac, is conducted between neutral point N1 of 3-phase coil 12 and neutral point N2 of 3-phase coil 14. The frequency at which the current direction is switched is the commercial alternating frequency. By controlling the duty of the npn transistor under switching-control such that the voltage difference between the alternating voltage generated at neutral point N1 and the alternating voltage generated at neutral point N2, corresponding to a phase-inverted version of the alternating voltage generated at neutral point N1, is equal to the commercial alternating voltage, alternating voltage Vac for commercial power supply can be generated across neutral points N1 and N2.

In the above-described case, alternating currents of the same phase are conducted to each of 3-phase coils 12 and 14, and motor generators MG1 and MG2 are not driven-controlled. Therefore, no torque is generated from motor generators MG1 and MG2.

The present invention is not limited to the above-described case in which all npn transistors Q11, Q13 and Q15 and all npn transistors Q12, Q14 and Q16 of inverter 20 are turned ON/OFF, and all npn transistors Q21, Q23 and Q25 and all npn transistors Q22, Q24, and Q26 of inverter 30 are turned ON/OFF to conduct an alternating current of the same phase to each of 3-phase coils 12 and 14. An alternating current of the same phase can be conducted to each of 3-phase coils 12 and 14 by turning ON/OFF at least one of npn transistors Q11, Q13 and Q15 and at least one of npn transistors Q12, Q14 and Q16 in inverter 20, and turning ON/OFF at least one of npn transistors Q21, Q23 and Q25 and at least one of npn transistors Q22, Q24 and Q26 in inverter 30.

A method of generating alternating voltage Vac when motor generators MG1 and MG2 are in a driving state in power output apparatus 100 will be described hereinafter. In this case, the driving torque generated by motor generators MG1 and MG2 may be a power running torque or a regenerative torque. Namely, alternating voltage Vac is generated in the case where the hybrid vehicle to which power output apparatus 100 is incorporated has stopped, and motor generator MG1 coupled to the engine is under regenerative driving and motor generator MG2 coupled to the drive shaft of the vehicle is under reaction force control (power running driving), or in the case where the hybrid vehicle to which power output apparatus 100 is incorporated is running, and motor generator MG1 is under regenerative driving and motor generator MG2 is under power running driving.

Figure 7:
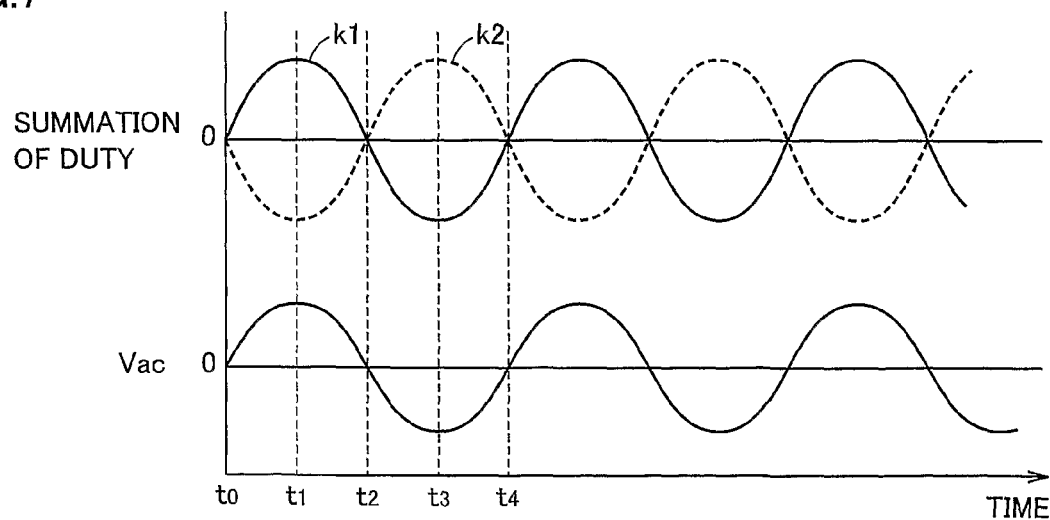
FIG. 7 is a waveform diagram of the summation of duty and alternating voltage for a commercial power supply.

Referring to the waveform diagram of FIG. 7 representing the duty summation and alternating voltage Vac for commercial power supply, curve k1 represents the change in the duty summation during switching control of inverter 20, whereas curve k2 represents the change in the duty summation during switching control of inverter 30. As used herein, "duty summation" is the value of subtracting the ON duty of the lower arm from the ON duty of the upper arm in each inverter.

Specifically, the potential at neutral point N1 in inverter 20 (neutral point N2 in inverter 30) rises or falls about the intermediate potential Vdc/2 of input voltage Vdc of inverter 20 (30) depending upon the magnitude relationship between the ON duty of npn transistors Q11, Q13 and Q15 (npn transistors Q21, Q23 and Q25 in inverter 30) constituting the upper arm of inverter 20 (30) and the ON duty of npn transistors Q12, Q14 and Q16 (npn transistors Q22, Q24 and Q26 in inverter 30) constituting the lower arm of inverter 20 (30). Therefore, when the summation of the duty of inverter 20 (30) is positive, the potential at neutral point N1 (N2) is higher than potential Vdc/2. When the summation of the duty of inverter 20 (30) is negative, the potential at neutral point N1 (N2) is lower than potential Vdc/2.

The frequency at which the duty summation changes corresponds to the commercial alternating frequency in FIG. 7.

In power output apparatus 100, control device 60 alters periodically the duty summation of inverter 20 at the commercial alternating frequency according to curve k1, and the duty summation of inverter 30 according to curve k2. The summation of the duty of inverter 30 can be altered periodically by a phase that is an inverted version of the phase by which the duty summation of inverter 20 is altered.

At time t0, the duty summation at both of inverters 20 and 30 is 0 (namely, the ON duty of the upper arm is equal to the ON duty of the lower arm). Neutral points N1 and N2 both attain the potential level of Vdc/2, and alternating voltage Vac generated across neutral points N1 and N2 is 0V.

At time t0-t1, the potential at neutral point N1 becomes higher than potential Vdc/2, and the potential at neutral point N2 becomes lower than potential Vdc/2. Therefore, alternating voltage Vac generated across neutral points N1 and N2 rises to take the peak at time t1.

At time t1-t2, the potential at neutral point N1 gradually becomes lower than the peak value, and the potential at neutral point N2 gradually becomes higher than the lowest value. Alternating voltage Vac generated across neutral points N1 and N2 attains the level of 0V at time t2.

At time t2-t3, the potential at neutral point N1 becomes lower than potential Vdc/2, and the potential at neutral point N2 becomes higher than potential Vdc/2. Therefore, alternating voltage Vac generated across neutral points N1 and N2 is boosted towards the negative side with its polarity inverted from that during time t0-t2 to attain the peak at the negative side at time t3. At time t3-t4, the potential at neutral point N1 gradually becomes higher than the lowest value, and the potential at neutral point N2 gradually becomes lower than the highest value. Alternating voltage Vac generated across neutral points N1 and N2 falls from the highest value at the negative side to attain the level of 0V at time t4.

During time t0-t2, the ON duty of the upper arm is larger than the ON duty of the lower arm at inverter 20. Therefore, the current flowing from the upper arm of inverter 20 to neutral point N1 of 3-phase coil 12 becomes larger than the current flowing from neutral point N1 to the lower arm of inverter 20. At inverter 30, the ON duty of the lower arm is larger than the ON duty of the upper arm. Therefore, the current flowing from neutral point N2 of 3-phase coil 14 to the lower arm of inverter 30 becomes larger than the current flowing to neutral point N2 from the upper arm of inverter 30. In inverters 20 and 30, the difference between the ON duty of the upper arm and the ON duty of the lower arm has the same absolute value with opposite polarities, as indicated by curves k1 and k2.

Accordingly, when the external load is connected to connector 50 and relay circuit 40 is ON, the current that could not flow from neutral point N1 to the lower arm of inverter 20 among the current flowing from the upper arm of inverter 20 to neutral point N1 flows to neutral point N2 of 3-phase coil 14 from neutral point N1 via AC line ACL1, the external load, and AC line ACL2, and then from neutral point N2 to the lower arm of inverter 30.

During time t2-t4, the ON duty of the upper arm is larger than the ON duty of the lower arm at inverter 30. Therefore, the current flowing to neutral point N2 of 3-phase coil 14 from the upper arm of the inverter 30 becomes larger than the current flowing from neutral point N2 to the lower arm of inverter 30. In inverter 20, the ON duty of the lower arm is larger than the ON duty of the upper arm. Therefore, the current flowing from neutral point N1 of 3-phase coil 12 to the lower arm of inverter 20 becomes larger than the current flowing from the upper arm of the inverter 20 to neutral point N1.

Accordingly, the current that could not flow from neutral point N2 into the lower arm of inverter 30 among the current flowing from the upper arm of inverter 30 to neutral point N2 in 3-phase coil 14 flows to neutral point N1 of 3-phase coil 12 from neutral point N2 via AC line ACL2, the external load, and AC line ACL1, and then flows from neutral point N1 to the lower arm of inverter 20.

Figure 8:
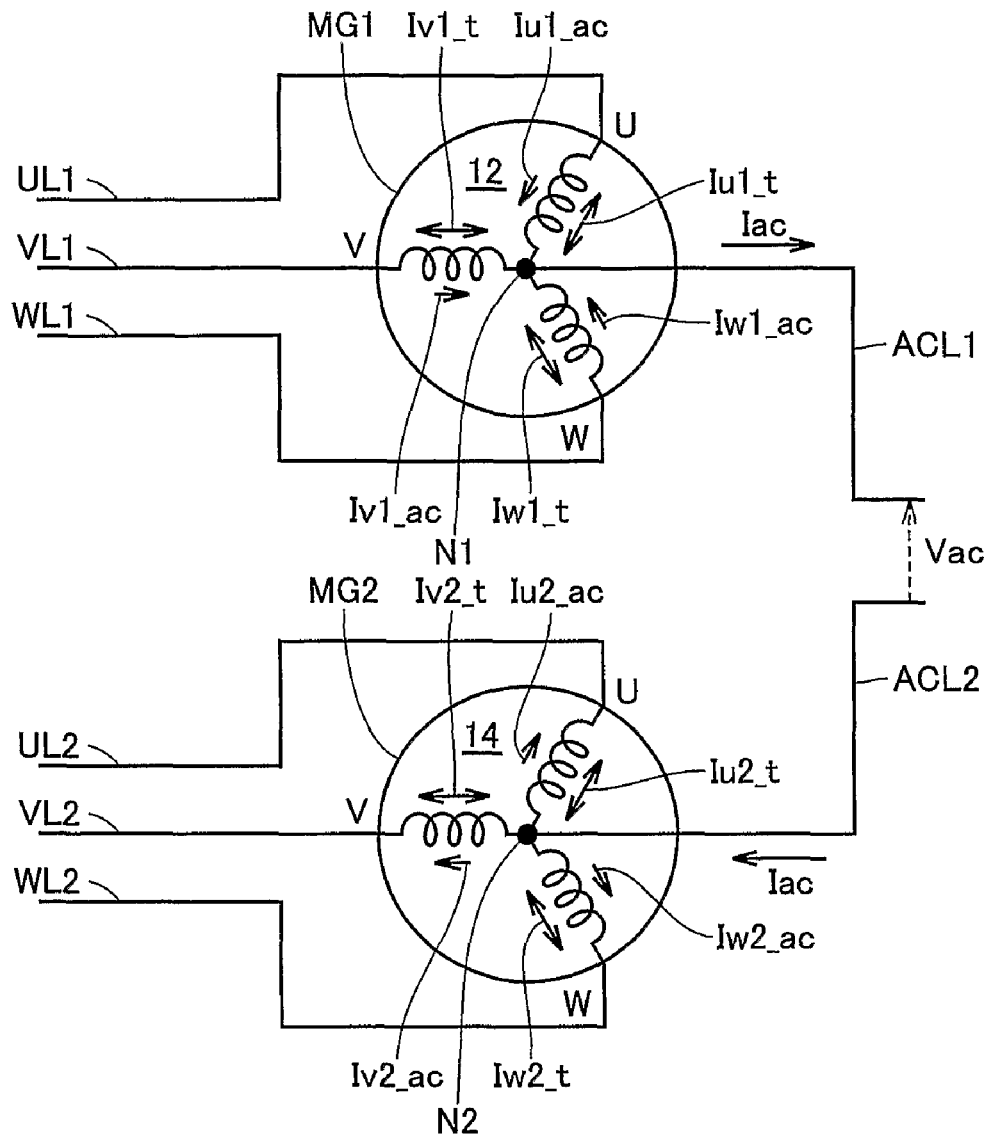
FIG. 8 represents current flowing to motor generators.

FIG. 8 represents the current flowing across motor generators MG1 and MG2. FIG. 8 corresponds to the case where alternating current Iac flows from neutral point N1 of motor generator MG1 to neutral point N2 of motor generator MG2.

Referring to FIG. 8, inverter 20 (not shown) connected to each of the U, V and W phase lines of UL1, VL1 and WL1 conducts switching based on signal PWM1 from control device 60. The U-phase current formed of current components Iu1_t and Iu1_ac is conducted to the U-phase coil of motor generator MG1. The V-phase current formed of current components Iv1_t and Iv1_ac is conducted to the V-phase coil of motor generator MG1. The W-phase current formed of current components Iw1_t and Iw1_ac is conducted to the W-phase coil of motor generator MG1.

Inverter 30 (not shown) connected to the U, V, and W phase lines of UL2, VL2 and WL2 conducts switching based on signal PWM2 from control device 60. The U-phase current formed of current components Iu2_t and Iu2_ac is conducted to the U-phase coil of motor generator MG2. The V-phase current formed of current components Iv2_t, and Iv2_ac is conducted to the V-phase coil of motor generator MG2. The W-phase current formed of current components Iw2_t and Iw2_ac is conducted to the W-phase coil of motor generator MG2.

As used herein, current components Iu1_t, Iv1_t and Iw1_t are directed to generating a torque from motor generator MG1, whereas current components Iu2_t, Iv2_t and Iw2_t are directed to generating a torque from motor generator MG2. Current components Iu1_ac, Iv1_ac and Iw1_ac flow to neutral point N1 of 3-phase coil 12 from the upper arm of inverter 20 by the control of setting the ON duty of the upper arm larger than the ON duty of the lower arm. Current components Iu2_ac, Iv2_ac and Iw2_ac flow into the lower arm of inverter 30 from neutral point N2 of 3-phase coil 14 by the control of setting the ON duty of the lower arm larger than the ON duty of the upper arm in inverter 30. Current components Iu1_ac, Iv1_ac, Iw1_ac, Iu2_ac, Iv2_ac and Iw2_ac are equal to each other, and do not contribute to the torque of motor generators MG1 and MG2. The total value of current components Iu1_ac, Iv1_ac and Iw1_ac and the total value of current components Iu2_ac, Iv2_ac and Iw2_ac each correspond to alternating current Iac.

Inverters 20 and 30 can generate alternating voltage Vac across neutral points N1 and N2 of motor generators MG1 and MG2 while controlling the drive of motor generators MG1 and MG2.

The method of generating alternating voltage Vac for commercial power supply when motor generator MG1 is in a regenerative mode and motor generator MG2 is in a non-driving state will be described hereinafter.

Figure 9:
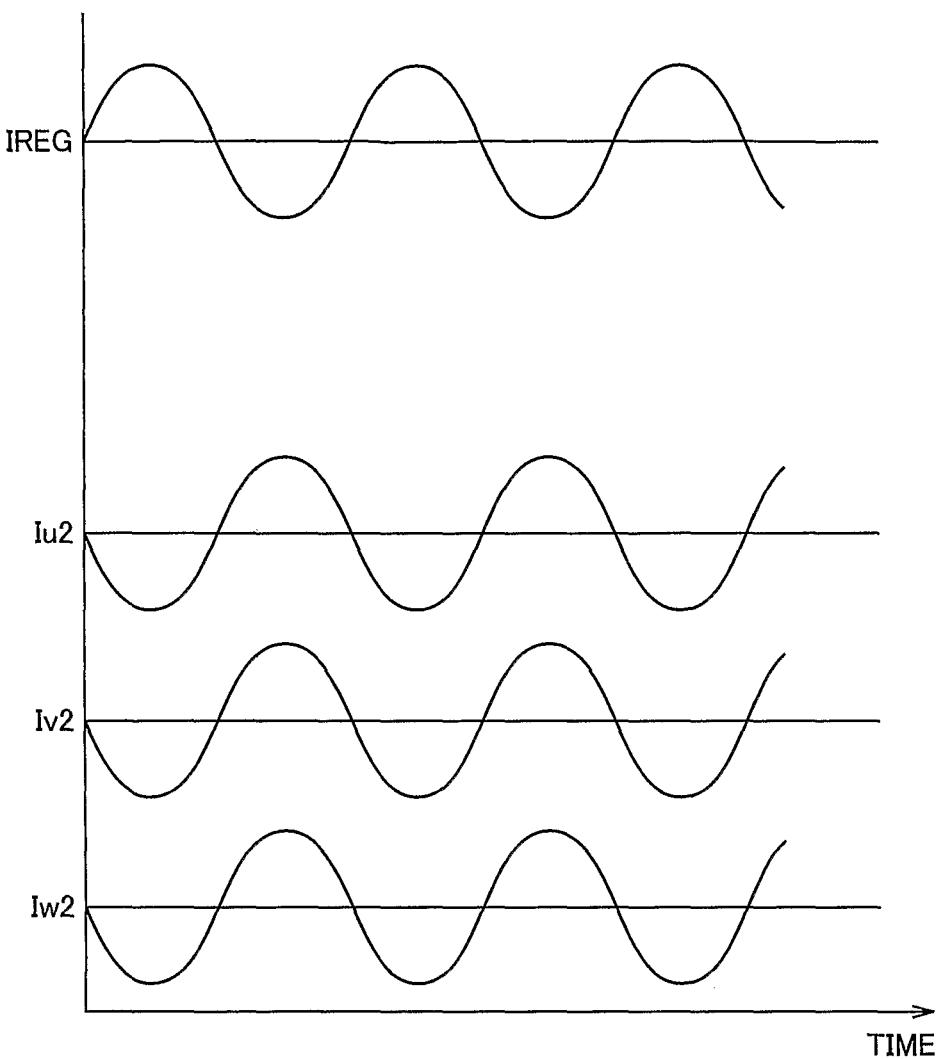
FIG. 9 is a timing chart of alternating current.

Referring to the timing chart of the alternating current of FIG. 9, inverter 20 drives motor generator MG1 in a regenerative mode. Therefore, motor generator MG1 supplies the generated regenerative current IREG to inverter 20. Inverter 30 conducts alternating currents Iu2, Iv2 and Iw2 that have the same phase with each other, corresponding to a phase-inverted version of regenerative current IREG, to the U-phase coil, V-phase coil, and W-phase coil, respectively, of 3-phase coil 14.

By controlling inverters 20 and 30 such the frequency of regenerative current IREG and alternating currents Iu2, Iv2 and Iw2 attain the commercial alternating frequency, and the voltage difference across neutral points N1 and N2 of 3-phase coils 12 and 14 attains the level of commercial alternating voltage, alternating voltage Vac for commercial power supply can be generated across neutral points N1 and N2.

Inverter 30 only conducts alternating currents Iu2, Iv2 and Iw2 of equal phase to each other to the U-phase coil, V-phase coil and W-phase coil, respectively, of 3-phase coil 14, as set forth above, and does not control the drive of motor generator MG2. Therefore, motor generator MG2 generates no torque.

The present invention is not limited to the above-described embodiment in which all of npn transistors Q21, Q23 and Q25 and all of npn transistors Q22, Q24 and Q26 of inverter 30 are turn ON/OFF to conduct an alternating current of identical phase in each phase coil of 3-phase coil 14, and only at least one of npn transistors Q21, Q23 and Q25, and at least one of npn transistors Q22, Q24 and Q26 of inverter 30 may be turned ON/OFF.

Although power output apparatus 100 can generate alternating voltage Vac in accordance with the method set forth above, alternating voltage Vac cannot be generated stably in the case where output of alternating voltage Vac to the external load is initiated when the SOC of battery B is insufficient, or when power is not generated by motor generator MG1. Further, the level of alternating voltage Vac will be reduced if the SOC of battery B is insufficient by the generation of alternating voltage Vac. In this context, AC output control unit 64 in power output apparatus 100 determines whether alternating voltage Vac can be output stably to the external load connected to connector 50, and controls the permission or prohibition of alternating voltage Vac output based on the determination result.

Figure 10:
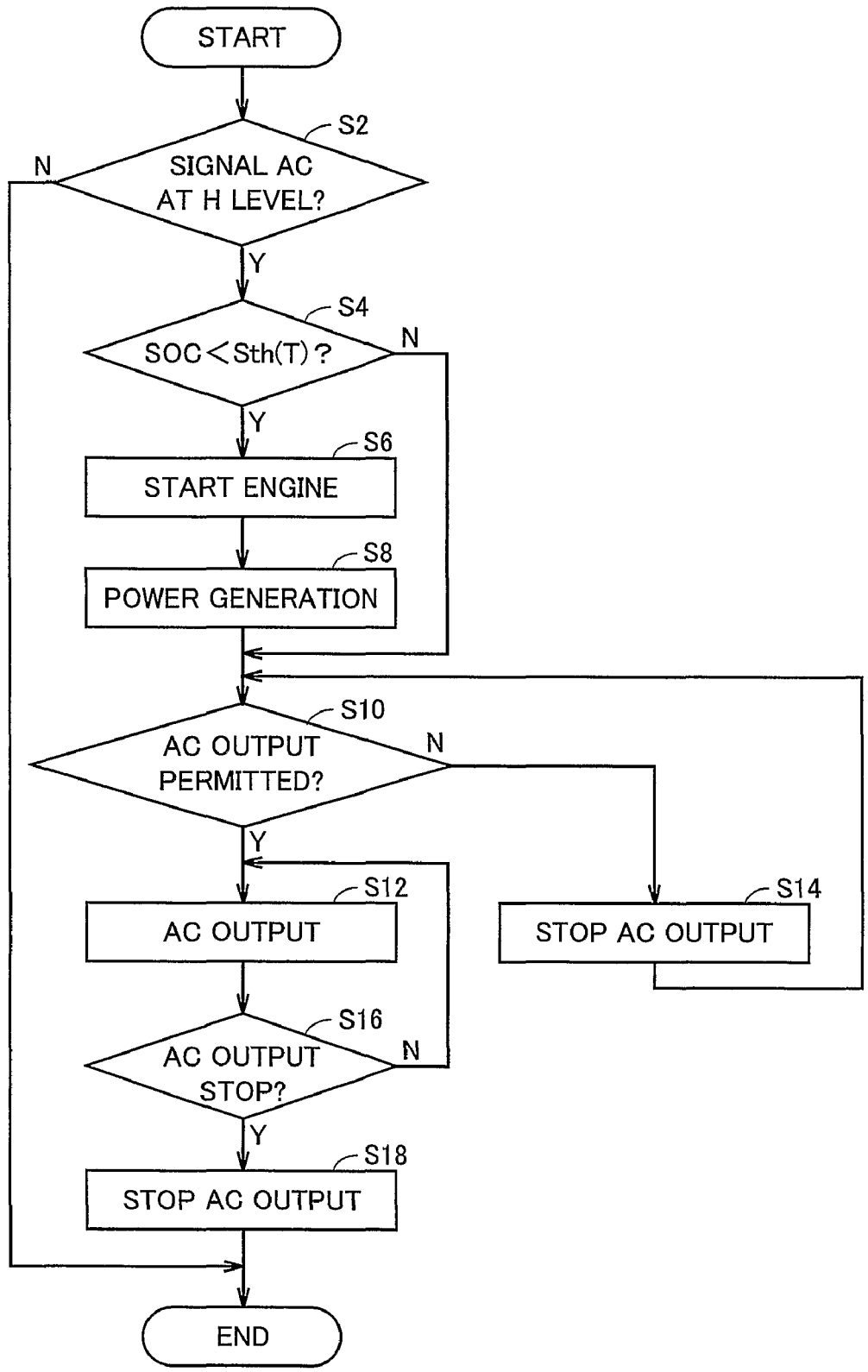
FIG. 10 is a flow chart of the operation of an alternating voltage output process by an AC output control unit of FIG. 2.

FIG. 10 is a flow chart of the operation related to the alternating voltage output process by AC output control circuit 64 described with reference to FIG. 2. Referring to FIG. 10, AC output control unit 64 determines whether the logic level of signal AC from the ECU is at an H level or not to determine whether output of alternating voltage Vac for commercial power supply is requested or not (step S2). When determination is made that signal AC is at an L level (NO at step S2), AC output control unit 64 determines that output of alternating voltage Vac is not requested, and the process ends.

When determination is made that signal AC is at an H level (YES at step S2), AC output control unit 64 checks the SOC of battery B and the engine state to determine whether alternating voltage Vac can be output stably or not. Specifically, AC output control unit 64 detects the SOC of battery B to determine whether it is lower than threshold value Sth (T) that depends on engine temperature T, as will be described afterwards (step S4).

When determination is made that the SOC of battery B is lower than threshold value Sth (T) (YES at step S4), the engine coupled to motor generator MG1 is started by motor generator MG1 (step S6), and power is generated by motor generator MG1 (step S8). When determination is made that the SOC of battery B is not lower than threshold value Sth (T) at step S4 (NO at step S4), control proceeds to step S10.

Figure 11:
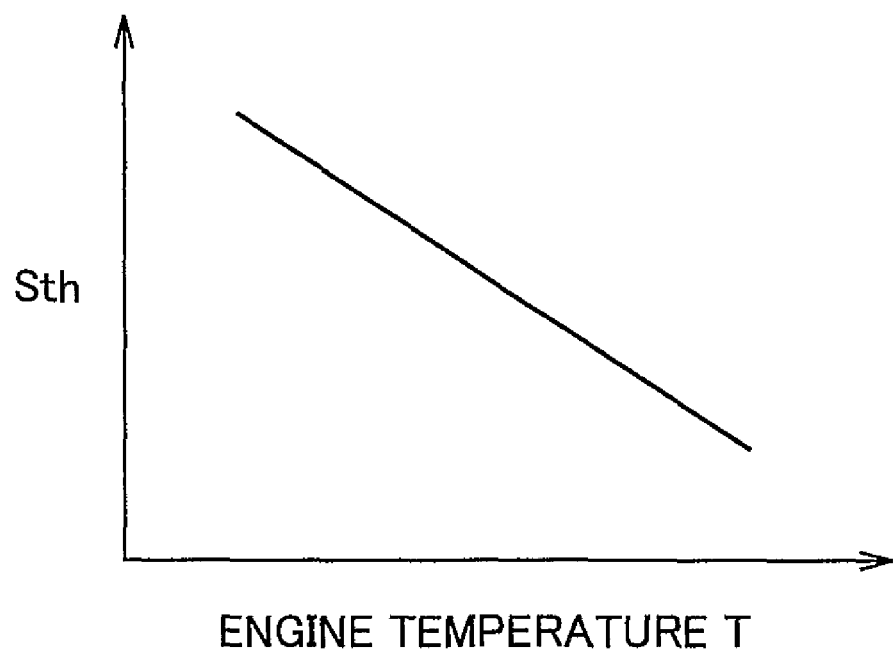
FIG. 11 represents the dependency of the threshold value of the SOC of the battery on the engine temperature.

Threshold value Sth (T) for the SOC of battery B depends on engine temperature T, and becomes higher as engine temperature T is lower, as shown in FIG. 11. It is to be noted that the engine is started by motor generator MG1, and a large torque is required at the time of starting in a low-temperature state since the working resistance of cranking becomes greater due to the increase of the oil viscosity. Therefore, the engine starting timing corresponding to the SOC of battery B is advanced in a low engine temperature state that requires a large torque current to start the engine.

In other words, AC output control unit 64 identifies the relationship between the SOC of battery B with threshold value Sth (T) depending on engine temperature T, i.e. the SOC of battery B and the engine state (engine temperature T and power-generated state by engine) in determining whether alternating voltage Vac can be output stably or not.

Then, AC output control unit 64 determines whether to permit output of alternating voltage Vac or not based on the SOC of battery B and the engine state, as well as whether voltage Vdc applied to inverters 20 and 30 is reliably provided or not (step S10). Specifically, AC output control unit 64 determines whether or not to permit output of alternating voltage Vac based on whether the SOC of battery B is at least threshold value Sth (T) depending upon engine temperature T, and sufficient to output alternating voltage Vac stably, and also whether input voltage Vdc required to generate alternating voltage Vac is provided reliably or not.

In the case where the SOC of battery B is lower than threshold value Sth (T), and power is generated by motor generator MG1, AC output control unit 64 may permit output of alternating voltage Vac after the SOC of battery B becomes higher than another threshold value that is higher than threshold value Sth (T). This prevents frequent switching of permitting/prohibiting output of alternating voltage Vac caused by variation of the SOC in the vicinity of threshold value Sth (T).

When output of alternating voltage Vac is permitted at step S10 (YES at step S10), alternating voltage Vac is generated across neutral points N1 and N2 of motor generators MG1 and MG2 by inverters 20 and 30. AC output control unit 64 outputs control signal CNTL of an H level to relay circuit 40. Accordingly, alternating voltage Vac for commercial power supply is output to the external load connected to connector 50 (step S12).

When output of alternating voltage Vac is not permitted (NO at step S10), AC output control unit 64 outputs control signal CNTL of an L level to relay circuit 40. Furthermore, control device 60 controls inverters 20 and 30 with the same switching pattern so as to prevent generation of alternating voltage Vac across neutral points N1 and N2 of motor generators MG1 and MG2. Accordingly, output of alternating voltage Vac can be inhibited reliably even if a defect such as welding occurs in relay circuit 40 (step S14). In the case where the hybrid vehicle to which power output apparatus 100 is incorporated is turned off, the switching operation of inverters 20 and 30 may be suppressed to prevent generation of alternating voltage Vac across neutral points N1 and N2 of motor generators MG1 and MG2.

During output of alternating voltage Vac, AC output control unit 64 determines whether to stop output of alternating voltage Vac based on information such as signal AC and detection of an abnormal event (step S16). When AC output control unit 64 determines that the output of alternating voltage Vac is not to be suppressed (NO at step S16), output of alternating voltage Vac to the external load connected to connector 50 is continued.

When AC output control unit 64 determines that output of alternating voltage Vac is to be ceased in response to the AC output switch being operated to result in signal AC of an L level or upon detection of some error (YES at step S16), output of alternating voltage Vac is ceased according to a procedure similar to that of step S14 (step S18).

Thus, according to power output apparatus 100 of the present invention, alternating voltage Vac for commercial power supply can be generated across neutral points N1 and N2 by controlling the potential at neutral points N1 and N2 of 3-phase coils 12 and 14 in motor generators MG1 and MG2.

In the case where alternating voltage Vac is to be generated when motor generators MG1 and MG2 are in a non-driving state, alternating voltage Vac can be set at an arbitrary frequency by selecting the frequency of the alternating current of identical phase conducted to respective phase coils of 3-phase coil 12 of motor generator MG1 by inverter 20, and the frequency of the alternating current of identical phase, corresponding to a phase-inverted version of the alternating current in motor generator MG1, conducted to respective phase coils of 3-phase coil 14 of motor generator MG2 by inverter 30. In other words, power output apparatus 100 can generate alternating voltage Vac of an arbitrary frequency.

In the case where alternating voltage Vac is to be generated when motor generator MG1 and MG2 are in a driving state in power output apparatus 100, the frequency of alternating voltage Vac is determined by the frequency that alters the duty when npn transistors Q11-Q16 and Q21-Q26 included in inverters 20 and 30 are switching-controlled. Therefore, alternating voltage Vac can be set at an arbitrary frequency by selecting the frequency that is employed to alter the duty when npn transistors Q11-Q16 and Q21-Q26 are switching-controlled. In other words, power output apparatus 100 can output alternating voltage Vac having an arbitrary frequency.

In the case where alternating voltage Vac is to be generated when motor generator MG1 is in a regenerative mode and motor generator MG2 is in a non-driving state in power output apparatus 100, alternating voltage Vac can be set at an arbitrary frequency by selecting the frequency of the alternating current of identical phase conducted to each phase coil of 3-phase coil 14 of motor generator MG2 by inverter 30 and the frequency of regenerative current IREG. In other words, power output apparatus 100 can generate alternating voltage Vac of an arbitrary frequency.

Since permission of output of alternating voltage Vac to the external load is determined based on the SOC of battery B in power output apparatus 100, determination can be made whether alternating voltage Vac can be generated stably or not prior to output of alternating voltage Vac. This prevents the output of an unstable operating voltage Vac.

When output of alternating voltage Vac to the external load is not permitted in power output apparatus 100, relays RY1 and RY2 in relay circuit 40 are turned off. Therefore, output of an unstable alternating voltage Vac is prevented. Furthermore, since inverters 20 and 30 are controlled such that a voltage difference is not generated across neutral points N1 and N2, output of an unstable alternating voltage can be prevented reliably even if there is a defect such as welding in relays RY1 and RY2 in relay circuit 40.

Since power output apparatus 100 generates alternating voltage Vac using inverters 20 and 30 that drive motor generators MG1 and MG2, a dedicated inverter to obtain alternating voltage Vac is not required. Furthermore, two inverters 20 and 30 contribute together to generating an alternating voltage.

Figure 12:
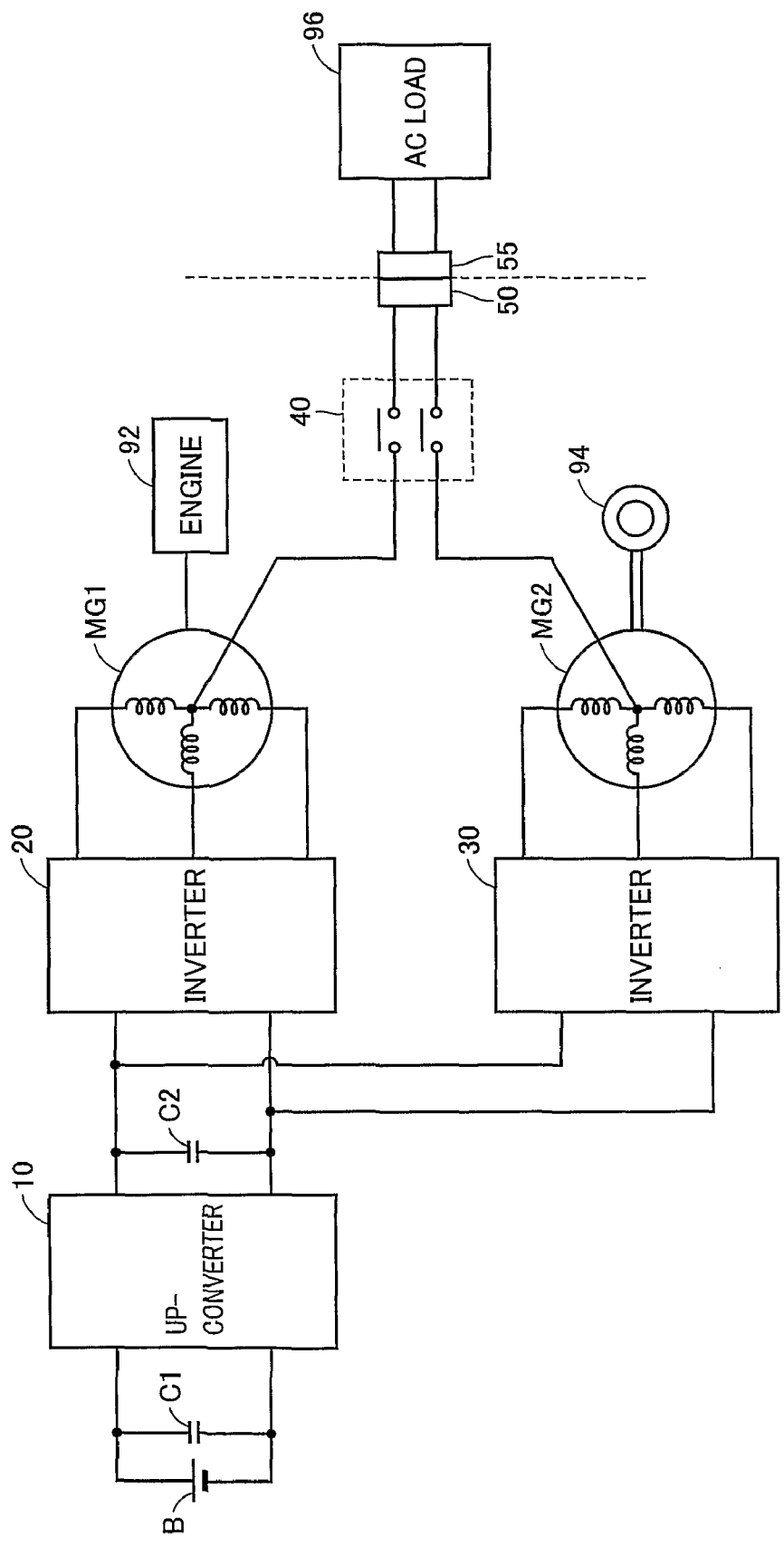
FIG. 12 is a schematic block diagram corresponding to the case where the power output apparatus of the present invention is applied to a hybrid vehicle.

FIG. 12 is a schematic block diagram representing the case where power output apparatus 100 of the present invention is applied to a hybrid vehicle. Referring to FIG. 12, motor generator MG1 is coupled to an engine 92 to start engine 92 as well as to generate power through the output from engine 92. Motor generator MG2 is coupled to a driving wheel 94 to drive the same, and generates power during a regenerative braking mode of the hybrid vehicle.

Connector 50 is connected to a receptacle 55 of an AC load 96 identified as an external load. Power output apparatus 100 supplies alternating voltage Vac for commercial power supply to AC load 96 via connector 50 and receptacle 55. Accordingly, AC load 96 can operate by receiving supply of alternating voltage Vac from power output apparatus 100.

Thus, the hybrid vehicle to which power output apparatus 100 is incorporated can be utilized as commercial AC power supply. Since this hybrid vehicle does not include a dedicated inverter to generate alternating voltage Vac, the added-value effect as a commercial AC power supply can be provided while realizing reduction in the size and weight as well as the cost of the vehicle.

The present invention is not limited to the above-described embodiment in which power output apparatus 100 is incorporated into a hybrid vehicle, and power output apparatus 100 may be employed in an electric vehicle or a fuel cell vehicle. The present invention is applicable to an apparatus that uses two motor generators. In the case where power output apparatus 100 is incorporated in an electric vehicle or a fuel cell electric vehicle, motor generators MG1 and MG2 are coupled to the driving wheel of the electric vehicle or fuel cell vehicle.

In the description set forth above, 3-phase coils 12 and 14 correspond to "first and second 3-phase coils", respectively. Inverters 20 and 30 correspond to "first and second inverters", respectively. First and second inverter control units 62 and 63 correspond to "first and second control units", respectively. Battery B corresponds to "direct current power supply". Motor generators MG1 and MG2 correspond to "first and second motor generators", respectively. Threshold value Sth (T) of the SOC of battery B corresponds to "first predetermined value".

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An alternating voltage generation apparatus comprising:
   first and second 3-phase coils,
   first and second inverters connected to said first and second 3-phase coils, respectively, to receive a direct-current voltage from a voltage supply line,
   a connector configured to allow connection with an external load receiving supply of alternating voltage from the alternating voltage generation apparatus,
   a relay circuit connected to a first neutral point of said first 3-phase coil and a second neutral point of said second 3-phase coil, and arranged between said first and second neutral points and said connector, and
   a control device controlling an operation of said first and second inverters and said relay circuit, wherein
   said first inverter responds to a first control signal from said control device to generate a first alternating voltage having a predetermined frequency at said first neutral point,
   said second inverter responds to a second control signal from said control device to generate at said second neutral point a second alternating voltage having said predetermined frequency, and corresponding to a phase-inverted version of said first alternating voltage, and
   said relay circuit responds to a third control signal from said control device to electrically connect said first and second neutral points with said connector, and provides to said connector a third alternating voltage having said predetermined frequency, and generated across said first and second neutral points.

2. The alternating voltage generation apparatus according to claim 1, wherein
   said first 3-phase coil comprises first to third coils,
   said second 3-phase coil comprises fourth to sixth coils,
   said first inverter comprises first to third arms provided corresponding to said first to third coils, respectively,
   said second inverter comprises fourth to sixth arms provided corresponding to said fourth to sixth coils, respectively,
   said control device comprises first and second control units for controlling said first and second inverters, respectively,
   said first control unit controls switching of at least one of said first to third arms such that a first alternating current of identical phase, having said predetermined frequency, is conducted to at least one of said first to third coils, and
   said second control unit controls switching of at least one of said fourth to sixth arms such that a second alternating current of identical phase, corresponding to a phase-inverted version of said first alternating current, is conducted to at least one of said fourth to sixth coils.

3. The alternating voltage generation apparatus according to claim 1, wherein
   said first 3-phase coil comprises first to third coils,
   said second 3-phase coil comprises fourth to sixth coils,
   said first inverter comprises first to third arms provided corresponding to said first to third coils, respectively,
   said second inverter comprises fourth to sixth arms provided corresponding to said fourth to sixth coils, respectively,
   said control device comprises first and second control units for controlling said first and second inverters, respectively,
   said first control unit alters a first duty of said first to third arms according to a first curve that changes at said predetermined frequency to control switching of said first to third arms, and
   said second control unit alters a second duty of said fourth to sixth arms according to a second curve corresponding to a phase-inverted version of said first curve to control switching of said fourth to sixth arms.

4. The alternating voltage generation apparatus according to claim 1, wherein
   said first 3-phase coil comprises first to third coils,
   said second 3-phase coil comprises fourth to sixth coils,
   said first inverter comprises first to third arms provided corresponding to said first to third coils, respectively,
   said second inverter comprises fourth to sixth arms provided corresponding to said fourth to sixth coils, respectively,
   said control device comprises first and second control units for controlling said first and second inverters, respectively,
   said first control unit controls said first inverter such that an alternating voltage generated by said first to third coils is converted into a direct-current voltage, and said second control unit controls switching of at least one of said fourth to sixth arms such that an alternating current of identical phase, corresponding to a phase-inverted version of the alternating voltage generated by said first to third coils, is conducted to at least one of said fourth to sixth coils.

5. The alternating voltage generation apparatus according to claim 1, further comprising a direct current power supply supplying said direct-current voltage to said voltage supply line,
wherein said control device determines whether to permit output of said third alternating voltage to said external load from said connector based on a state of charge of said direct current power supply.

6. The alternating voltage generation apparatus according to claim 1, wherein said relay circuit electrically disconnects said first and second neutral points from said connector according to said third control signal when output of said third alternating voltage to said external load from said connector is prohibited by said control device.

7. The alternating voltage generation apparatus according to claim 1, wherein said control device controls said first and second inverters such that a voltage difference is not generated across said first and second neutral points when output of said third alternating voltage to said external load (96) from said connector is prohibited.

8. The alternating voltage generation apparatus according to claim 1, wherein said control device ceases operation of said first and second inverters when output of said third alternating voltage to said external load from said connector is prohibited.

9. The power output apparatus according to claim 1, further comprising a direct current power supply supplying said direct-current voltage to said voltage supply line, wherein
said first motor generator is coupled to an internal combustion engine of a vehicle,
said second motor generator is coupled to a driving wheel of said vehicle,
said control device controls said first inverter such that, when a state of charge of said direct current power supply is lower than a first predetermined value, output of said third alternating voltage to said external load from said connector is prohibited, and power is generated from said first motor generator by starting said internal combustion engine, and
permitting output of said third alternating voltage to said external load from said connector after the state of charge of said direct current power supply exceeds at least a second predetermined value that is equal to or higher than said first predetermined value.

10. The power output apparatus according to claim 9, wherein said first predetermined value is larger as a temperature of said internal combustion engine is lower.

11. A power output apparatus comprising:
a first motor generator including a first 3-phase coil as a stator coil,
a second motor generator including a second 3-phase coil as a stator coil,
first and second inverters connected to said first and second 3-phase coil, respectively, receiving a direct-current voltage from a voltage supply line,
a connector configured to allow connection with an external load receiving supply of alternating voltage from the power output apparatus,
a relay circuit connected to a first neutral point of said first 3-phase coil and a second neutral point of said second 3-phase coil, and arranged between said first and second neutral points and said connector, and
a control device controlling an operation of said first and second inverters and said relay circuit, wherein
said first inverter responds to a first control signal from said control device to generate a first alternating voltage having a predetermined frequency at said first neutral point,
said second inverter responds to a second control signal from said control device to generate a second alternating voltage having said predetermined frequency, and corresponding to a phase-inverted version of said first alternating voltage, at said second neutral point, and
said relay circuit responds to a third control signal from said control device to electrically connect said first and second neutral points to said connector, and provide a third alternating voltage having said predetermined frequency, generated across said first and second neutral points, to said connector.

12. The power output apparatus according to claim 11, wherein
said first 3-phase coil comprises first to third coils,
said second 3-phase coil comprises fourth to sixth coils,
said first inverter comprises first to third arms provided corresponding to said first to third coils, respectively,
said second inverter comprises fourth to sixth arms provided corresponding to said fourth to sixth coils, respectively,
said control device comprises first and second control units for controlling said first and second inverters, respectively, and
when said first and second motor generators are in a non-driving state,
said first control unit controls switching of at least one of said first to third arms such that a first alternating current of identical phase, having said predetermined frequency, is conducted to at least one of said first to third coils, and
said second control unit controls switching of at least one of said fourth to sixth arms such that a second alternating current of identical phase, corresponding to a phase-inverted version of said first alternating current, is conducted to at least one of said fourth to sixth coils.

13. The power output apparatus according to claim 11, wherein
said first 3-phase coil comprises first to third coils,
said second 3-phase coil comprises fourth to sixth coils,
said first inverter comprises first to third arms provided corresponding to said first to third coils, respectively,
said second inverter comprises fourth to sixth arms provided corresponding to said fourth to sixth coils, respectively,
said control device comprises first and second control units for controlling said first and second inverters, respectively, and
when said first and second motor generators are in a driving state,
said first control unit alters a first duty of said first to third arms according to a first curve that changes at said predetermined frequency to control switching of said first to third arms, and
said second control unit alters a second duty of said fourth to sixth arms according to a second curve, corresponding to a phase-inverted version of said first curve, to control switching of said fourth to sixth arms.

14. The power output apparatus according to claim 11, wherein
said first 3-phase coil comprises first to third coils,
said second 3-phase coil comprises fourth to sixth coils, said first inverter comprises first to third arms provided corresponding to said first to third coils, respectively, said second inverter comprises fourth to sixth arms provided corresponding to said fourth to sixth coils, respectively, said control device comprises first and second control units for controlling said first and second inverters, respectively, and when said first motor generator is in a regenerative mode, and said second motor generator is in a non-driving state, said first control unit controls said first inverter such that an alternating voltage generated by said first to third coils is converted into a direct-current voltage, and said second control unit controls switching of at least one of said fourth to sixth arms such that an alternating current of identical phase, corresponding to a phase-inverted version of the alternating voltage generated by said first to third coils, is conducted to at least one of said fourth to sixth coils.

* * * * *